United States Patent
Sone et al.

(10) Patent No.: US 6,965,003 B2
(45) Date of Patent: Nov. 15, 2005

(54) BLOCK COPOLYMER, PROCESS FOR PRODUCING THE SAME, AND MOLDED OBJECT

(75) Inventors: Atsushi Sone, Kawasaki (JP); Tsutomu Nagamune, Kawasaki (JP); Masakazu Hashimoto, Kawasaki (JP); Toru Murata, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/333,906

(22) PCT Filed: Aug. 6, 2001

(86) PCT No.: PCT/JP01/06751

§ 371 (c)(1),
(2), (4) Date: Jan. 31, 2003

(87) PCT Pub. No.: WO02/12362

PCT Pub. Date: Feb. 14, 2002

(65) Prior Publication Data

US 2003/0207983 A1 Nov. 6, 2003

(30) Foreign Application Priority Data

| Aug. 4, 2000 | (JP) | 2000-237488 |
| Aug. 24, 2000 | (JP) | 2000-253619 |
| Sep. 29, 2000 | (JP) | 2000-299447 |
| Oct. 19, 2000 | (JP) | 2000-319363 |
| Nov. 7, 2000 | (JP) | 2000-339540 |

(51) Int. Cl.$^7$ .......... C08F 112/08; C08F 36/08; C08C 19/02

(52) U.S. Cl. .......... 526/308; 526/346; 526/335; 525/338

(58) Field of Search .......... 526/308, 346, 526/335; 525/338

(56) References Cited

U.S. PATENT DOCUMENTS 3,792,127 A * 2/1974 Davison et al. .......... 525/93

FOREIGN PATENT DOCUMENTS

| EP | 0 989 417 A1 | 3/2000 |
| JP | 01-294721 | 11/1989 |
| JP | 01-317728 | 12/1989 |
| JP | 06-199950 | 7/1994 |
| JP | 06 199950 | 7/1994 |
| WO | WO 94/21694 | 9/1994 |
| WO | WO 98/55886 | 12/1998 |

* cited by examiner

*Primary Examiner*—Ling-Sui Choi
(74) *Attorney, Agent, or Firm*—Armstrong, Kratz, Quintos, Hanson & Brooks, LLP

(57) ABSTRACT

A block copolymer comprising a polymer block [A] and a polymer block [B]. The polymer block [A] contains mainly a repeating unit having an alicyclic structure, and the polymer block [B] contains the repeating unit having an alicyclic structure and a repeating unit derived from a diene based monomer and/or a vinyl based monomer. In any block, the carbon-carbon unsaturated bonds are hydrogenated. The block copolymer is molded into optical disks, optical waveguides, films, sheets, containers, and optical lenses.

36 Claims, 3 Drawing Sheets

BLOCK COPOLYMER, PROCESS FOR PRODUCING THE SAME, AND MOLDED OBJECT

TECHNICAL FIELD

The present invention relates to a block copolymer containing alicyclic structure in the repeating units, a production method thereof, and a variety of molded objects formed by molding the same copolymer.

BACKGROUND ART

There are known hydrogenated products of aromatic vinyl polymers, which are obtained by hydrogenation of the aromatic rings of the aromatic vinyl polymers such as polystyrene, and hydrogenated products of aromatic vinyl copolymers, which are obtained by hydrogenation of the copolymers produced from aromatic vinyl compounds and vinyl compounds. For example, as disclosed in Japanese Patent Laid-Open No. 1-317728, hydrogenated products of polymers such as a hydrogenated polystyrene resin, a hydrogenated product of styrene-butadiene-styrene block copolymer, and the like (hereinafter, referred to as hydrogenated polystyrene resin, as the case may be) are small in refractive index, so that they are suitable for use as the molding material of optical disks.

It has been proposed that in order to increase the recording density of an optical disk, two or more sheets of thin substrate are bonded together, and a short wavelength laser is used to record and play back the information. A substrate for such a high recording density optical disk is required to have a high mechanical strength and an excellent light transmittance. However, in the above described hydrogenated products of polymers, the mechanical strength, in particular, bending strength is low, and furthermore, the birefringence and light transmittance have been demanded to be improved.

Specifically, the hydrogenated polystyrene resin is insufficient in mechanical strength as compared to poly(methyl methacrylate) resin (PMMA) used as molding material for optical parts, and hence it has been difficult to use the hydrogenated polystyrene as the material for the optical parts other than optical disks and miniature lenses, in particular, for plate molded objects. As a plate molded object made of PMMA, there can be cited an optical waveguide for back light in a liquid crystal display element (LCD). In these years, large, thin, and light optical waveguides have been demanded, and accordingly the heat resistance and the like are required for the materials concerned.

The styrene-ethylene-butylene-styrene block copolymer (SEBS), which is a hydrogenated product of the styrene-butadiene-styrene block copolymer (SBS), has the heat resistance, weather resistance, and oil resistance, improved by hydrogenation as compared to those of SBS, and accordingly its applications to a variety of uses have been studied. Lately, SEBS is used as sheets for use in civil engineering and construction, and a study has started on its use in the medical field. However, SEBS is not high in elastic modulus, and hence it is restricted to the use as relatively thick sheets. In addition, SEBS is not transparent, and accordingly its use in the optical field has been difficult.

International Publication WO98/55886 describes the hydrogenated product of an aromatic vinyl polymer, in which the aromatic ring hydrogenation rate is 97% or more, the weight average molecular weight is from 100,000 to 300,000, and the molecular weight distribution is 2.0 or less, and which can be used as polarization film and phase difference film. However, this polymer has been invented as a material suitable for use in formation of plastic lenses excellent in low birefringence, and there are disclosed only the possibilities for use in such special optical films as described above. Recently, there is a high demand for polymer films in the fields of information, medical services, and food products; there is a demand for films and sheets which are excellent in transparency, heat resistance, mechanical strength, and the like, and can be used in a variety of uses.

Additionally, SEBS is not high in elastic modulus, so that it has been difficult to form vessels of SBBS by injection molding or blow molding SBBS and to use them. On the other hand, Japanese Patent Laid-Open No. 6-199950 discloses that a molded object made of a vinylated cyclic hydrocarbon polymer or a hydrogenated product thereof is moderate in transparency, and is excellent in chemical resistance, low elution, electric insulation, and the like, so that it is useful for medical instruments and materials, electric insulation materials, and materials for processing electric parts, and can be used for chemical substance containers and food containers.

However, the containers made of the above described polymer sufficiently meet the usage as containers standing still and simply holding things; but when they are used in such a way that they suffer bending stress or light impact, in particular, in a manner of being repeatedly used, in a manner of being carried about, or in a manner of being superposed and stacked, there comes about a drawback that cracking and fracturing occur owing to their insufficient mechanical strength. Recently, in the fields of medical care and food industry, there are demands for containers excellent in transparency, heat resistance, mechanical strength, and the like.

Furthermore, in parallel with the demand for downsizing the apparatus for reading signals from a magneto-optical disk which is a recording medium of a computer, a pickup lens is demanded to be downsized and made uneven in thickness. Such an optical lens tends to exhibit birefringence when downsized and made uneven in thickness. Accordingly, there is expected the advent of an optical lens formed by use of a material further low in birefringence.

As for laser printers, in parallel with the demand for use of large-sized sheets of paper, there is a demand for an upsized, thin, light single-layer lens as the fθ lens, instead of a conventional thick stacked plano-convex lens. On the other hand, there is also a demand for downsizing the laser printers, and accordingly there has come out a demand for a meniscus-convex lens downsized and made uneven in thickness. As a response to such a variety of needs, it is necessary to bring about the advent of a lens, transparent and low in birefringence, provided with such a mechanical strength as can actualize the molding of demanded shapes.

DISCLOSURE OF THE INVENTION

It is an object of the present invention to provide a novel block copolymer excellent in low birefringence, mechanical strength, and light transmittance, a method of producing the block copolymer, a block copolymer composition containing the block copolymer, and a molded object formed of the block copolymer (inclusive of the composition).

Another object of the present invention is to provide such molded objects excellent in transparency, heat resistance, and mechanical strength as optical information recording mediums such as optical disks, optical waveguides, films, sheets, and containers.

A further object of the present invention is to provide an optical lens excellent in transparency, low birefringence, and mechanical strength, and capable of being downsized and made uneven in thickness or being upsized and thin.

As a result of diligent study directed towards solving the above described objects, the present inventors discovered that a hydrogenated block copolymer (namely, a block copolymer containing alicyclic structure) can be obtained which is excellent in low birefringence, mechanical strength, and light transmittance, by synthesizing a block copolymer which contains the polymer block containing in a large proportion the repeating unit derived from an aromatic vinyl compound, and the polymer block containing in a proportion smaller than that in the preceding polymer block the repeating unit derived from the aromatic vinyl compound; and by adding hydrogen to the carbon-carbon unsaturated bonds including the aromatic rings in the block copolymer.

Additionally, the present inventors discovered that a variety of molded products can be obtained which are excellent in transparency, heat resistance, mechanical strength, and the like, when molding optical waveguides, films, sheets, and containers, by use of the hydrogenated product of the block copolymer which product is obtained as follows: a block copolymer is synthesized which contains the polymer block containing the repeating unit derived from an aromatic vinyl compound and the polymer block containing the repeating unit derived from a chain conjugated diene and/or a chain vinyl compound; and then hydrogen is added to the carbon-carbon unsaturated bonds including the aromatic rings in the block copolymer to yield the hydrogenated product of the block copolymer.

The present invention has been perfected on the basis of these findings.

Thus, according to the present invention, there is provided a block copolymer comprising a polymer block [A] and a polymer block [B], wherein:

(i) the polymer block [A] contains a repeating unit [1] represented by the following formula (1) in a proportion of 50 mol % or more,

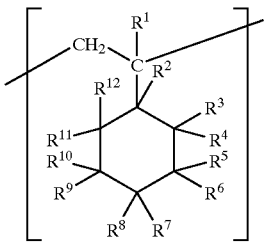

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom;

(ii) the polymer block [B] contains the above described repeating unit [1], and at least one repeating unit selected from the group consisting of a repeating unit [4] represented by the following formula (4),

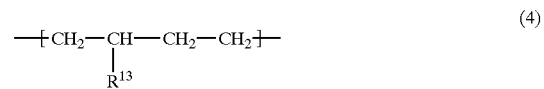

where $R^{13}$ represents a hydrogen atom or an alkyl group having 1 to 20 carbon atoms, and a repeating unit [5] represented by the following formula (5),

where $R^{14}$ and $R^{15}$ each represents independently a hydrogen atom or an alkyl group having 1 to 20 carbon atoms; and wherein the molar fraction $m_2$ (mol %) of the repeating unit [4] and the molar fraction $m_3$ (mol %) of the repeating units [5] in the polymer block [B] satisfy the relationship represented by the following expression:

$$2 \times m_2 + m_3 \geq 2 (\text{mol \%});$$

(iii) the molar fraction a (mol %) of the repeating unit [1] in the polymer block [A] and the molar fraction b (mol %) of the repeating unit [1] in the polymer block [B] satisfy the relationship represented by a>b; and (iv) the weight average molecular weight ranges from 10,000 to 300,000.

Additionally, according to the present invention, there is provided a production method of block copolymer which is a method of producing a block copolymer comprising the polymer block [A] and the polymer block [B], wherein:

a block copolymer containing a polymer block [A'] and a polymer block [B'] is synthesized by a process which comprises at least each one of the following processes (I) and (II) in an arbitrary order:

(I) a process for obtaining a polymer block [A'] by polymerizing a monomer mixture [a'] containing an aromatic vinyl compound in a proportion of 50 mol % or more, and (II) a process for obtaining a polymer block [B'] by polymerizing a monomer mixture [b'] containing a vinyl based monomer in 2 mol % or more, and the aromatic vinyl compound in a proportion smaller than that in the monomer mixture [a']; and which comprises (III) a process for hydrogenating subsequently the carbon-carbon unsaturated bonds in the block copolymer.

Furthermore, according to the present invention, there are provided block copolymer compositions comprising the block copolymer, laminated materials having the layers made of the block copolymer, and molded objects made of the block copolymer (for example, optical information recording mediums, optical waveguides, films, sheets, containers, and optical lenses).

More specifically, according to the present invention, there are provided a variety of molded objects as described below.

An optical waveguide made by molding a block copolymer which contains the polymer block [A] containing the repeating unit [1] represented by the following formula (1),

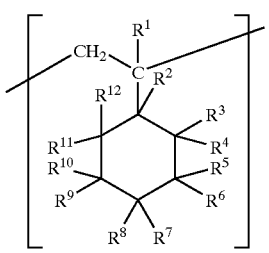

(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom; and the block [B] containing at least one repeating unit selected from the group consisting of the repeating unit [4] represented by the following formula (4),

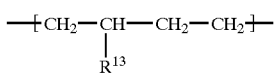

(4)

where $R^{13}$ represents a hydrogen atom or an alkyl group having 1 to 20 carbon atoms, and the repeating unit [5] represented by the following formula (5),

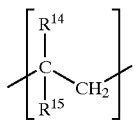

(5)

where $R^{14}$ and $R^{15}$ each represents independently a hydrogen atom or an alkyl group having 1 to 20 carbon atoms.

A film or a sheet made by molding a block copolymer which contains the polymer block [A] containing the repeating unit [1] represented by the following formula (1),

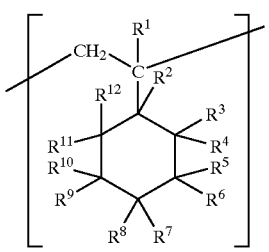

(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom; and the block [B] containing at least one repeating unit selected from the group consisting of the repeating unit [4] represented by the following formula (4),

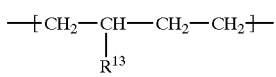

(4)

where $R^{13}$ represents a hydrogen atom or an alkyl group having 1 to 20 carbon atoms, and the repeating unit [5] represented by the following formula (5),

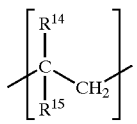

(5)

where $R^{14}$ and $R^{15}$ each represents independently a hydrogen atom or an alkyl group having 1 to 20 carbon atoms.

A container made by molding a block copolymer which contains the polymer block [A] containing the repeating unit [1] represented by the following formula (1),

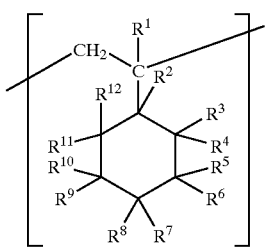

(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom; and the block [B] containing at least one repeating unit selected from the group consisting of the repeating unit [4] represented by the following formula (4),

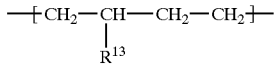

(4)

where $R^{13}$ represents a hydrogen atom or an alkyl group having 1 to 20 carbon atoms, and the repeating unit [5] represented by the following formula (5),

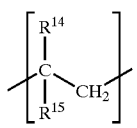

(5)

where $R^{14}$ and $R^{15}$ each represents independently a hydrogen atom or an alkyl group having 1 to 20 carbon atoms.

An optical lens made by molding a block copolymer which contains the polymer block [A] containing the repeating unit [1] represented by the following formula (1),

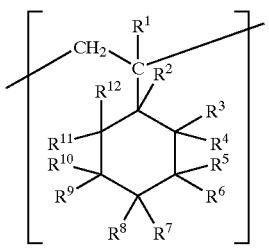
(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom; and the block [B] containing the repeating unit [1] and at least one repeating unit selected from the group consisting of the repeating unit [4] represented by the following formula (4),

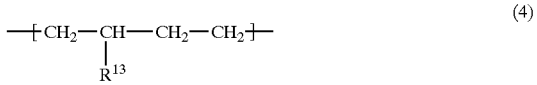
(4)

where $R^{13}$ represents a hydrogen atom or an alkyl group having 1 to 20 carbon atoms, and the repeating unit [5] represented by the following formula (5);

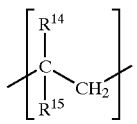
(5)

where $R^{14}$ and $R^{15}$ each represents independently a hydrogen atom or an alkyl group having 1 to 20 carbon atoms; and wherein:

the molar fraction a (mol %) of the repeating unit [1] in the polymer block [A] and the molar fraction b (mol %) of the repeating unit [1] in the polymer block [B] satisfy the relationship represented by a>b.

BEST MODE FOR CARRYING OUT THE INVENTION

Figure 1:
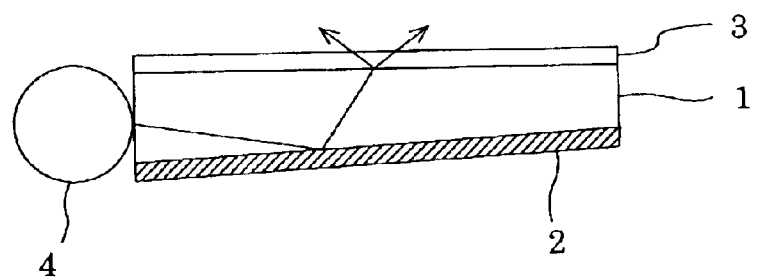
FIG. 1 is a sectional view of an example of an edge type back light in a liquid crystal display, showing a specific example of an optical waveguide 1.

1. Block Copolymer:

A novel block copolymer of the present invention comprises a polymer block [A] and a polymer block [B].

The polymer block [A] contains a repeating unit [1] represented by the formula (1) described below. The content of the repeating unit [1] in the polymer block [A] is 50 mol % or more, preferably 70 mol % or more, more preferably 90 mol % or more, and the upper limit thereof is 100 mol %.

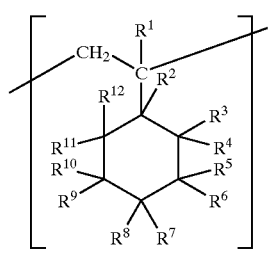
(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom;

The repeating unit [1] represented by the formula (1) is preferably a repeating unit represented by the following formula (2),

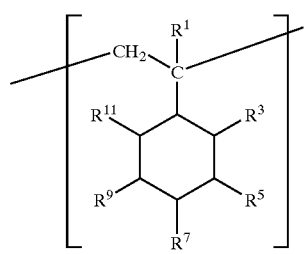
(2)

where the respective symbols are the same as those described above.

A preferable structure of the repeating unit [1] represented by the above formula (1) is a structure wherein $R^1$ is hydrogen or a methyl group, and $R^2$ to $R^{12}$ are hydrogen. In particular, a preferable form of the repeating unit [1] is a repeating unit [3] represented by the following formula (3),

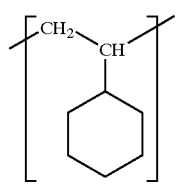
(3)

When the content of the repeating unit [1] in the polymer block [A] is too small, the mechanical strength is degraded. Accordingly, when the content of the repeating unit [1] falls within the above described range, there are attained excellent low birefringence, light transmittance, and mechanical strength.

The rest part other than the repeating unit [1] in the polymer block [A] is a repeating unit derived from chain conjugated dienes and chain vinyl compounds.

The polymer block [B] contains the above described repeating unit [1], and at least one repeating unit selected from the group consisting of a repeating unit [4] represented by the following formula (4),

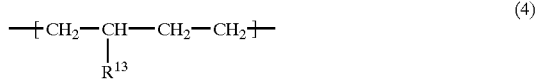

(4)

where $R^{13}$ represents a hydrogen atom or an alkyl group having 1 to 20 carbon atoms, and a repeating unit [5] represented by the following formula (5),

(5)

where $R^{14}$ and $R^{15}$ each represents independently a hydrogen atom or an alkyl group having 1 to 20 carbon atoms.

The content of the repeating unit [1] in the polymer block [B] is preferably 40 to 95 mol %, more preferably 50 to 90 mol %. When the content of the repeating unit [1] falls within the above described ranges, there are attained excellent light transmittance, low birefringence, and mechanical strength.

When the molar fraction of the repeating unit [4] and the molar fraction of the repeating units [5] in the block [B] are denoted by $m_2$ and $m_3$ (mol %), $2 \times m_2 + m_3$ is 2 mol % or more, preferably 5 to 60 mol %, more preferably 10 to 50 mol %.

A preferable structure of the repeating unit [4] represented by the above formula (4) is a structure wherein $R^{13}$ is hydrogen or a methyl group. Additionally, a preferable structure of the repeating unit [5] represented by the above formula (5) is a structure wherein $R^{14}$ is hydrogen and $R^{15}$ is a methyl group or an ethyl group.

When the content of the repeating unit [4] or the content of the repeating unit [5] is too small in the polymer block [B], the mechanical strength is degraded. Accordingly, when the content of the repeating unit [4] and the content of the repeating unit [5] fall within the above described ranges, there are attained excellent low birefringence, light transmittance, and mechanical strength.

Furthermore, the polymer block [B] may contain a repeating unit [6] represented by the following formula (6),

(6)

where $R^{16}$ represents a hydrogen atom or an alkyl group having 1 to 20 carbon atoms, $R^{17}$ represents a nitrile group, an alkoxycarbonyl group, a hydrocarbonyl group, a hydroxycarbonyl group, or a halogen atom, and $R^{18}$ represents a hydrogen atom; incidentally, $R^{17}$ and $R^{18}$ may be bonded to each other to form an acid anhydride group or an imide group.

The content of the repeating unit [6] corresponds to an amount that does not degrade the characteristics of the block copolymer of the present invention, and is usually 30 mol % or less in relation to the total amount of the block copolymer, preferably 20 mol % or less.

As for the block copolymer of the present invention, with a representing the molar fraction of the repeating unit [1] in the polymer block [A] and b representing the molar fraction of the repeating unit [1] in the polymer block [B], it is preferable that a>b. By making that a>b, there are attained excellent low birefringence, light transmittance, and mechanical strength.

As for the block copolymer of the present invention, with $m_a$ representing the total number of moles of all the repeating units constituting the block [A], and $m_b$ representing the total number of moles of all the repeating units constituting the block [B], the ratio ($m_a:m_b$) is preferably 5:95 to 95:5, more preferably 30:70 to 95:5, further more preferably 40:60 to 90:10. When the ($m_a:m_b$) value falls in the above described ranges, there are attained excellent mechanical strength and heat resistance.

The molecular weight of the block copolymer of the present invention, in terms of the weight average molecular weight (Mw) related to a standard polystyrene value as measured by gel permeation chromatography (hereinafter GPC), ranges from 10,000 to 300,000, preferably from 15,000 to 250,000, more preferably from 20,000 to 200,000. When the weight average molecular weight (Mw) of the block copolymer falls within the above described ranges, there is attained an excellent balance among the mechanical strength, heat resistance, and moldability.

The molecular weight distribution of the block copolymer can be appropriately selected according to the purpose of use; the ratio (Mw/Mn) between the weight average molecular weight (Mw) and the number average molecular weight (Mn) related to a standard polystyrene value as measured by GPC is usually in the range of 5 or less, preferably in the range of 4 or less, more preferably in the range of 3 or less. When the Mw/Mn falls in the above described ranges, there are attained excellent mechanical strength and heat resistance.

The glass transition temperature (Tg) of the block copolymer can be appropriately selected according to the purpose of use; the high-temperature side value as measured on a differential scanning calorimeter (DSC) is usually 70 to 200° C., preferably 80 to 180° C., more preferably 90 to 160° C. In many cases, with the Tg value ranging from 70 to 150° C., there is obtained satisfactory heat resistance.

Examples of the block copolymer structure include the structures containing block structure represented by the following expressions:

$(A-B)_n$, $(A-B)_n-A$, $(B-A)_n-B$, where A represents the polymer block [A], B represents the polymer block [B], and n is an integer falling in the range from 1 to 10.

Preferably n is 1 to 5, more preferably 1. Preferable specific examples of the block structure include the diblock type of A-B, and the triblock types of A-B-A and B-A-B; another acceptable example is the block structure in which these respective blocks are bonded to each other in a radial type.

2. Production Method of Block Copolymers:

The block copolymers of the present invention can be obtained, for example, by the following method I or II.

Method I

A method wherein: a block copolymer having a polymer block [A'] and a polymer block [B'] is obtained at least via a process of obtaining the polymer block [A'] containing a repeating unit derived from an aromatic vinyl compound and/or an alicyclic vinyl compound having an unsaturated bond or unsaturated bonds in the ring(s) by polymerizing a monomer mixture [a'] containing in a proportion of 50 mol % or more the aromatic vinyl compound and/or the alicyclic vinyl compound having an unsaturated bond or unsaturated bonds in the ring(s), and a process of obtaining the polymer block [B'] containing a repeating unit derived from an aromatic vinyl compound and/or an alicyclic vinyl compound having an unsaturated bond or unsaturated bonds in the ring(s) and a repeating unit derived from a vinyl based monomer by polymerizing a monomer mixture [b'] containing a vinyl based monomer in 2 mol % or more, and the aromatic vinyl compound and/or the alicydlic vinyl compound having an unsaturated bond or unsaturated bonds in the ring(s) in a proportion smaller than that in the monomer mixture [a']; and a process for hydrogenating subsequently the aromatic rings and/or aliphatic rings in the block copolymer is included.

Method II

A method of obtaining a block copolymer containing a polymer block [A] and a polymer block [B], at least via a process of obtaining the polymer block [A] containing a repeating unit derived from an alicyclic vinyl compound by polymerizing a monomer mixture [a] containing a saturated alicyclic vinyl compound in a proportion of 50 mol % or more, and a process of obtaining the polymer block [B] containing a repeating unit derived from an alicyclic vinyl compound and a repeating unit derived from a vinyl based monomer by polymerizing a monomer mixture [b] containing a vinyl based monomer in a proportion of 2 mol % or more and the saturated alicyclic vinyl compound in a proportion smaller than that in the monomer mixture [a].

Of the two above described methods, the method I is more preferable from the viewpoint of the easiness in obtaining the monomers, polymerization yield, easiness in introducing the repeating unit [1] into the polymer block [B'], and the like. Further, in the above method I the aromatic vinyl compound is preferably used as a starting material.

In other words, a production method of block copolymer which is a method of producing a block copolymer containing the polymer blocks [A] and the polymer blocks [B], wherein:

a block copolymer containing a polymer block [A'] and a polymer block [B'] is synthesized by a process which comprises at least each one of the following processes (I) and (II) in an arbitrary order:

(I) a process for obtaining a polymer block [A'] by polymerizing a monomer mixture [a'] containing an aromatic vinyl compound in a proportion of 50 mol % or more, and (II) a process for obtaining a polymer block [B'] by polymerizing a monomer mixture [b'] containing a vinyl based monomer in 2 mol % or more, and the aromatic vinyl compound in a proportion smaller than that in the monomer mixture [a']; and which comprises (III) a process for hydrogenating subsequently the carbon-carbon unsaturated bonds in the block copolymer.

Specific examples of the aromatic vinyl compounds used in the above method I include: styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene, 4-phenylstyrene, and the like; and the styrenes having such substituents as a hydroxyl group and an alkoxy group. Among these, styrene, 2-methylstyrene, 3-methylstyrene, and 4-methylstyrene are preferable.

Specific examples of the unsaturated alicyclic vinyl compounds used in the above method I include: cyclohexenylethylene, α-methylcyclohexenylethylene, α-t-butylcyclohexenylethylene, and the like. These compounds may contain such substituents as a halogen atom, an alkoxy group, a hydroxyl group, and the like.

These aromatic vinyl compounds and alicyclic vinyl compounds can be used each alone, or in combination of two or more thereof; in the present invention, in any of the monomer mixtures [a'] and [b'], an aromatic vinyl compound is preferably used, and in particular, styrene or α-methylstyrene is preferably used.

The vinyl based monomer used in the above method includes a chain vinyl compound and a chain conjugated diene compound.

Specific examples of the chain vinyl compound include: such chain olefin monomers as ethylene, propylene, 1-butene, 1-pentene, 4-methyl-1-pentene, and the like. Among these, the chain olefin monomers are preferable, and in particular, ethylene, propylene, and 1-butene are most preferable.

The chain conjugated dienes include, for example, butadienes (1,3-butadiene, 1,2-butadiene), isopropylene, 2,3-dimethyl-1,3-butadiene, 1,3-pentadiene, 1,3-hexadiene, and the like. Among these chain vinyl compounds and chain conjugated dienes, the chain conjugated dienes are preferable, and butadiene and isoprene are particularly preferable. These chain vinyl compounds and chain conjugated dienes can be used each alone, or in combination of two or more thereof.

When polymerizing a monomer mixture containing the above described monomers, the polymerization reaction may be based on any of the radical polymerization, anionic polymerization, and cationic polymerization; in order to obtain the block copolymer of the present invention, anionic polymerization is preferably adopted, and it is most preferable that living anionic polymerization is performed in the presence of an inert solvent.

The anionic polymerization is performed in the presence of a polymerization initiator, and usually in the temperature range from 0 to 200° C., preferably from 20 to 100° C., particularly preferably from 20 to 80° C.

As the initiator, there can be used such monoorganolithium compounds as n-butyllithium, sec-butyllithium, t-butyllithium, hexyllithium, phenyllithium, and the like; and such multifunctional organolithium compounds as dilithiomethane, 1,4-diobutane, 1,4-dilithio-2-ethylcyclohexane, and the like.

As the inert solvent used, there can be used, for example, such aliphatic hydrocarbons as n-butane, n-pentane, isopentane, n-hexane, n-heptane, isooctane, and the like; such alicylic hydrocarbons as cyclopentane, cyclohexane, methylcyclopentane, methylcyclohexane, decalin, and the like; such aromatic hydrocarbons as benzene, toluene, and the like; and the like. When the aliphatic hydrocarbons and alicyclic hydrocarbons among these are used, they can be further used as it is as inert solvents in the hydrogenation reaction. These solvents can be used each alone or in combination of two or more thereof. The solvent is usually used in such a proportion of 200 to 10,000 parts by weight in relation to 100 parts by weight of the total amount of the monomers used.

When polymerizing the respective polymer blocks, a polymerization accelerator or a randomizer can be used, in order to prevent the chain extension of a particular component within each block. In particular, when the polymerization reaction is performed on the basis of the anionic polymerization, a Lewis base compound and the like can be used as the randomizer. Specific examples of the Lewis base compound include: such ether compounds as dimethyl ether, diethyl ether, diisopropyl ether, dibutyl ether, tetrahydrofuran, diphenyl ether, ethylene glycol diethyl ether, ethylene glycol methyl phenyl ether, and the like; such tertiary amine compounds as tetramethylethylenediamine, trimethylamine, triethylamine, pyridine, and the like; such alkali metal alkoxide compounds as potassium t-amyloxide, potassium t-butyloxide, and the like; and such phosphine compounds as triphenylphosphine and the like. These Lewis base compounds can be used each alone or in combination of two or more thereof.

As for the method of obtaining the block copolymer on the basis of the living anionic polymerization, there can be cited a successive addition polymerization reaction method and a coupling method, both well known in the art; in the present invention, the successive addition polymerization reaction method is preferable.

When the block copolymer containing the polymer block [A'] and the polymer block [B'] is obtained on the basis of the successive addition polymerization reaction method, the process of obtaining the polymer block [A'] and the process of obtaining the polymer block [B'] are performed successively and continuously. Specifically, the polymer block [A'] is obtained by polymerizing the monomer mixture [a'] in an inert solvent in the presence of the living anionic polymerization catalyst, and successively the polymerization is continued by adding the monomer mixture [b'] to the reactant system concerned to obtain the polymer block [B'] bonded to the polymer block [A'].

The block copolymer obtained is recovered by the methods well known in the art, such as the steam stripping method, direct solvent removal method, alcohol coagulation method, and the like. When a solvent inert to the hydrogenation reaction is used in the polymerization reaction, the polymerization solution can be used as it is for the hydrogenation reaction process, and hence it is not necessary to recover the block copolymer from the polymerization solution.

Among the block copolymers, obtained by the above method I, having the polymer block [A'] and the polymer block [B'] (hereinafter, referred to as "the pre-hydrogenation block copolymers"), the block copolymers having the following repeating unit are preferable.

The polymer block [A'] constituting a preferable pre-hydrogenation block copolymer is the polymer block containing the repeating unit [7] represented by the following formula (7) in 50 mol % or more,

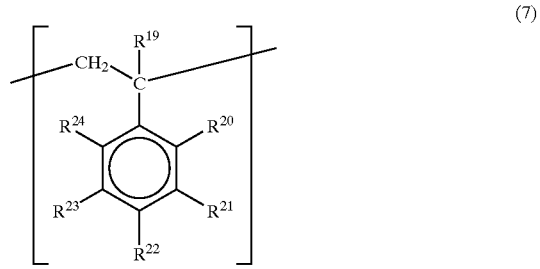

where $R^{19}$ represents a hydrogen atom or an alkyl group having 1 to 20 carbon atoms, $R^{20}$ to $R^{24}$ each represents independently a hydrogen atom, an alkyl group having 1 to 20 carbon atoms, a hydroxyl group, an alkoxy group having 1 to 20 carbon atoms, or a halogen atom.

The repeating unit [7] is preferably the repeating unit represented by the following formula (8),

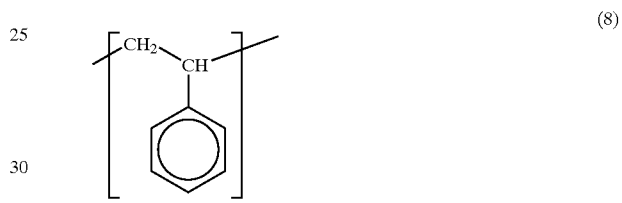

The preferable polymer block [B'] is a polymer block which contains without fail the above described repeating unit [7], and contains at least one of the repeating unit [9] represented by the following formula (9),

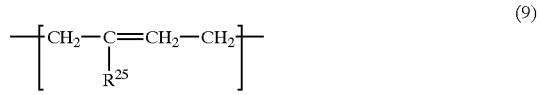

where $R^{25}$ represents a hydrogen atom or an alkyl group having 1 to 20 carbon atoms, and the repeating unit [10] represented by the following formula [10],

where $R^{26}$ represents a hydrogen atom or an alkyl group having 1 to 20 carbon atoms, and $R^{27}$ represents a hydrogen atom, an alkyl group having 1 to 20 carbon atoms, or an alkenyl group having 2 to 20 carbon atoms.

With a' representing the molar fraction of the repeating unit [4] in the polymer block [A'] and b' representing the molar fraction of the repeating unit [4] in the polymer block [B'], it is preferable that a'>b'.

In the block [B'], the repeating unit [11] represented by the following formula (11) may be contained,

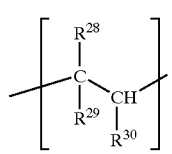

(11)

where $R^{28}$ represents a hydrogen atom or an alkyl group having 1 to 20 carbon atoms, $R^{29}$ represents a nitrile group, an alkoxycarbonyl group, a hydrocarbonyl group, a hydroxycarbonyl group, or a halogen atom, $R^{30}$ represents a hydrogen atom; incidentally, $R^{29}$ and $R^{30}$ may be bonded to each other to form an acid anhydride group or an imide group.

In the preferable pre-hydrogenation block copolymer, with $m_a'$ representing the total number of moles of all the repeating units constituting the block [A'], and $m_b'$ representing the total number of moles of all the repeating units constituting the block [B'], the ratio $(m_a':m_b')$ is preferably 5:95 to 95:5, more preferably 30:70 to 95:5, further more preferably 40:60 to 90:10. When the $(m_a':m_b')$ value falls in the above described ranges, there are attained excellent mechanical strength and heat resistance.

The molecular weight of the preferable pre-hydrogenation block copolymer, in terms of the weight average molecular weight (Mw) related to a standard polystyrene value as measured by gel permeation chromatography (hereinafter GPC), ranges from 12,000 to 400,000, preferably from 19,000 to 350,000, more preferably from 25,000 to 300,000. The pre-hydrogenation block copolymer tends to exhibit through hydrogenation a decreasing tendency of molecular weight. When the weight average molecular weight (Mw) of the pre-hydrogenation block copolymer is too small, the mechanical strength is degraded, while when it is too large, the hydrogenation rate is degraded.

The molecular weight distribution of the preferable pre-hydrogenation block copolymer can be appropriately selected according to the purpose of use; the ratio (Mw/Mn) between the weight average molecular weight (Mw) and the number average molecular weight (Mn) related to a standard polystyrene (or polyisoprene) value as measured by GPC is usually in the range of 5 or less, preferably in the range of 4 or less, more preferably in the range of 3 or less. When the Mw/Mn falls in the above described ranges, there is improved the hydrogenation rate.

The glass transition temperature (Tg) of the preferable pre-hydrogenation block copolymer can be appropriately selected according to the purpose of use; the high-temperature side value as measured on a differential scanning calorimeter (DSC) is usually 70 to 200° C., preferably 80 to 180° C., more preferably 90 to 160° C. In many cases, with the Tg value ranging from 70 to 150° C., there is obtained satisfactory heat resistance.

Hydrogenation Method of Unsaturated Bonds

There is no particular limitation to the method and reaction mode for hydrogenation of the carbon-carbon unsaturated bonds in the unsaturated rings of the aromatic rings, cycloalkene rings, and the like in the above described pre-hydrogenation block copolymer, and the unsaturated bonds in the main chain and the side chains; the hydrogenation concerned can be performed according to the methods well known in the art. Among them, a hydrogenation method, capable of raising the hydrogenation rate and low in the degree of the polymer chain breaking reaction, is preferable.

Specifically, there can be cited a method performing the hydrogenation in an organic solvent using a catalyst containing at least one metal selected from nickel, cobalt, iron, titanium, rhodium, palladium, platinum, ruthenium, and rhenium. As the hydrogenation catalyst, either a heterogeneous catalyst or a homogeneous catalyst can be used.

The heterogeneous catalyst can be used in the form of metal or a metal compound, or in the form of being supported on an appropriate carrier. Examples of the carrier include active charcoal, silica, alumina, calcium carbonate, titania, magnesia, zirconia, diatom earth, silicon carbide, and the like. The catalyst supporting amount of the carrier usually ranges from 0.01 to 80 wt %, preferably from 0.05 to 60 wt %.

As the homogeneous catalyst, there can be used a catalyst formed combining a compound of nickel, cobalt, titanium, or iron with an organometallic compound (for example, an organoaluminium compound, an organolithium compound), or an organometallic complex catalyst of rhodium, palladium, platinum, ruthenium, rhenium, and the like. As the compound of nickel, cobalt, titanium, or iron, there are used, for example, the acetylacetonates, naphthenates, cyclopentadienyl compounds, cyclopentadienyl dichloro compounds, and the like of the respective metals. As the organoaluminium compounds, there are suitably used such alkylaluminiums as triethylaluminium, truisobutylaluminium, and the like; such aluminium halides as diethylaluminium chloride, ethylaluminium dichloride, and the like; such aluminium hydrides as disobutylaluminium hydride, and the like; and the like.

As for the examples of the organometallic complex catalysts, there are used such metal complexes of the above described metals as the γ-dichloro-π-benzene complexes, dichloro-tris(triphenylphosphine) complexes, hydrido-chloro-triphenylphosphine complexes.

These hydrogenation catalysts are used each alone or in combination of two or more thereof. The used amount of a hydrogenation catalyst is usually a proportion of 0.01 to 100 parts by weight, preferably 0.05 to 50 parts by weight, more preferably 0.1 to 30 parts by weight, in relation to 100 parts by weight of the polymer.

The temperature of the hydrogenation reaction is usually 10 to 250° C.; the hydrogenation is performed at a temperature preferably of 50 to 200° C., more preferably of 80 to 180° C., on the grounds that the hydrogenation rate can be raised and the polymer chain breaking reaction can be reduced. The pressure in the hydrogenation reaction is usually 0.1 to 30 MPa. On the same grounds as described above, and additionally from the viewpoint of operationality, it is desirable that the pressure is preferably 1 to 20 MPa, more preferably 2 to 10 Mpa.

As for the hydrogenation rate of the block copolymer, on the basis of the $^1$H-NMR measurements, either the hydrogenation rate for the carbon-carbon unsaturated bonds in the main chain and in the side chains, or the hydrogenation rate for the carbon-carbon unsaturated bonds in the aromatic rings and cycloalkene rings is usually 90% or more, preferably 95% or more, more preferably 97% or more. When the hydrogenation rate is too low, the low birefringence and the thermal stability of the obtained block copolymer are degraded.

On completion of the hydrogenation reaction, the block copolymer can be recovered as follows: the hydrogenation catalyst is removed from the reaction solution, for example, by a method of filtration, centrifugation, or the like, and subsequently the block copolymer is recovered by the method of removing the solvent by direct drying, by the method in which the reaction solution is poured into a poor solvent for the block copolymer and the block copolymer is coagulated, or by the like.

3. Compounding Agents:

The block copolymer of the present invention can be turned into a block copolymer composition, by blending a variety of compounding agents according to need. There is no particular limitation to the compounding agents which can be blended into the block copolymer; examples of the compounding agents include such stabilizing agents as an antioxidant, a heat stabilizer, a light stabilizer, a weather resistance agent, an ultraviolet absorbent, and a near infrared absorbent; such resin modifying agents as a lubricant and a plasticizer; such colorants as a dye and a pigment; and an antistatic agent, a fire retardant, a filler, and the like. These compounding agents can be used each alone or in combination of two or more thereof, and the blend amounts are appropriately selected within the ranges not impairing the objects of the present invention.

Antioxidants

As the antioxidants, there can be cited the phenol based antioxidants, phosphorus based antioxidants, sulfur based antioxidants, and the like; among them, the phenol based antioxidants are preferable, and the alkyl-substituted phenol based antioxidants are particularly preferable. By blending these antioxidants, the coloring and the strength degradation of the molded material, due to the oxidative deterioration during molding and the like, can be prevented without degrading the transparency and low water absorption property.

These antioxidants can be used each alone or in combination of two or more thereof. The blend amounts of the antioxidants are appropriately selected within the ranges not impairing the objects of the present invention, and are usually 0.001 to 5 parts by weight, preferably 0.01 to 1 part by weight, in relation to the 100 parts by weight of the block copolymer.

Ultraviolet Absorbents

As the ultraviolet absorbents, there can be cited such benzophenone based ultraviolet absorbents as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-benzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone, and bis(5-benzoyl-4-hydroxy-2-methoxyphenyl)methane; and such benzotriazole based ultraviolet absorbents as 2-(2'-hydroxy-5'-methylphenyl) benzotriazole, 2-(2H-benzotriazol-2-yl)-4-methyl-6-(3,4,5,6-tetrahydrophthalimidylmethyl)phenol, 2-(2H-benzotriazol-2-yl)-4,6-bis(1-methyl-1-phenylethyl)phenol, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-di-tert-amylphenyl)benzotriazole, 2-[2'-hydroxy-3'-(3",4",5",6"-tetrahydrophthalimidomethyl)-5'-methylphenyl]benzotriazole, and 2,2'-methylene-bis[4-(1,1,3,3-tetramethylbutyl)-6-(2H-benzotriazol-2-yl)phenol].

Among the above, 2-(2'-hydroxy-5'-methylphenyl)benzotriazole, 2-(2H-benzotriazol-2-yl)-4-methyl-6-(3,4,5,6-tetrahydrophthalimidylmethyl)phenol, 2-(2H-benzotriazol-2-yl)-4,6-bis(1-methyl-1-phenylethyl)phenol, and the like are preferable from the viewpoint of the heat resistance, low volatility, and the like.

The blend amounts of ultraviolet absorbents are appropriately selected within the ranges not impairing the objects of the present invention, and are usually 0.001 to 10 parts by weight, preferably 0.01 to 5 parts by weight, in relation to the 100 parts by weight of the block copolymer.

Light Stabilizers

As the light stabilizers, there can be cited the benzophenone based light stabilizers, benzotriazole based light stabilizers, hindered amine based light stabilizers, and the like; in the present invention, it is preferable to use the hindered amine based light stabilizers, from the viewpoint of the transparency, anti-coloration property, and the like of the molded objects.

Among the hindered amine based light stabilizers (hereinafter abbreviated as "HALS"), those which have the number average molecular weight (Mn), as measured by gel permeation chromatography (GPC) with tetrahydrofuran (THF) as solvent, of 1,000 to 10,000 are preferable, those which have the Mn of 2,000 to 5,000 are more preferable, and those which have the Mn of 2,800 to 3,800 are most preferable.

A too small Mn causes a drawback that when the HALS is blended into the block copolymer by the hot melt kneading, a prescribed amount of HALS cannot be blended owing to volatilization; and another drawback that during the hot melt kneading such as the injection molding and the like, the foam, silver streak, and the like are formed; thus degrading the processing stability. Additionally, in the case of a molded object, such as an optical waveguide, to be used at a high temperature, for example, for a long period of time with a lamp turned on, the volatile component in the molded object is evaporated to turn into a gas. On the contrary, a too large Mn degrades the dispersibility into the block copolymer, accordingly degrading the transparency of the molded object and reducing the effect of improving the light resistance. Thus, by selecting the HALS's having the above described ranges of Mn, there can be achieved those molded objects such as optical waveguides excellent in the processing stability, low degree of gas generation, and transparency.

Specific examples of such HALS's include:

such high molecular weight HALS's in which a plurality of piperidine rings are bonded to each other via the triazine skeletons as N,N',N",N'"-tetrakis-(4,6-bis-(butyl-(N-methyl-2,2,6,6-tetramethylpiperidin-4-yl)amino)-triazin-2-yl)-4,7-diazadecane-1,10-diamine, the polycondensation product obtained from dibutylamine, 1,3,5-triazine, and N,N'-bis(2,2,6,6-tetramethyl-4-piperidyl)butylamine, poly[{(1,1,3,3-tetramethylbutyl)amino-1,3,5-triazin-2,4-diyl}{(2,2,6,6-tetramethyl-4-piperidyl)imino}hexamethylene{(2,2,6,6,-tetramethyl-4-piperidyl)imino}], the polycondensation product obtained from 1,6-hexanediamine-N,N'-bis(2,2,6,6-tetramethyl-4-piperidyl) and morpholine-2,4,6-trichloro-1,3,5-triazine, poly[(6-morpholino-s-triazin-2,4-diyl)[(2,2,6,6-tetramethyl-4-piperidyl)imino]-hexamethylene[(2,2,6,6-tetramethyl-4-piperidyl)imino]; and such high molecular weight HALS's in which the piperidine rings are bonded to each other via the ester bonds as the polymerization product between dimethyl succinate and 4-hydroxy-2,2,6,6-tetramethyl-1-piperidine ethanol, the mixed esterification product obtained from 1,2,3,4-butane tetracarboxylic acid, 1,2,2,6,6-pentamethyl-4-piperidinol, and 3,9-bis(2-hydroxy-1,1-dimethylethyl)-2,4,8,10-tetraoxaspiro[5,5]undecane.

Among the above, the HALS's having Mn of 2,000 to 5,000 are preferable such as the polycondesation product obtained from dibutylamine, 1,3,5-triazine, and N,N'-bis(2,2,6,6-tetramethyl-4-piperidyl)butylamine; poly[{(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}]; and the polymerization product obtained from dimethyl succinate and 4-hydroxy-2,2,6,6-tetramethyl-1-peperidine ethanol.

The blend amount of the above described HALS's in relation to the block copolymer is usually 0.01 to 20 parts by weight, preferably 0.02 to 15 parts by weight, more preferably 0.05 to 10 parts by weight, in relation to 100 parts by weight of the polymer. When the addition amount of the HALS is too small, sufficient effect cannot be obtained in improving the light resistance; for example, coloration is caused when an optical waveguide is used over a long period of time with a lamp turned on. When the blend amount of the HALS is too large, a part thereof is turned into a generated gas, and the dispersibility thereof into the block copolymer is degraded, the transparency of, for example, an optical waveguide being degraded.

In the present invention, by blending at least one of the compounding agents selected from the group consisting of (1) a soft polymer, (2) an alcoholic compound, and (3) an organic filler or an inorganic filler to the block copolymer, the white turbidity can be prevented which is caused by being allowed to stand for a long period of time in the environment of high temperature and high humidity, without degrading various properties such as the transparency, low water absorption property, mechanical strength, and the like. Among these compounding agents, the soft polymer and alcoholic compound are preferable, since they are excellent in the effect of preventing the white turbidity generated in the environment of high temperature and high humidity, and maintaining the transparency of the block copolymer.

Soft Polymers

Specific examples of the soft polymers include: such olefin based soft polymers as polyethylene, polypropylene, ethylene-α-olefin copolymer, ethylene-propylene-diene copolymer (EPDM), and the like; such isobutylene based soft polymers as polyisobutylene, isobutylene-isoprene rubber, isobutylene-styrene copolymer; such diene based soft polymers as polybutadiene, polyisoprene, butadiene-styrene random copolymer, isoprene-styrene random copolymer, acrylonitrile-butadiene copolymer, acrylonitrile-butadiene-styrene copolymer, butadiene-styrene block copolymer, styrene-butadiene-styrene block copolymer, isoprene-styrene block copolymer, styrene-isoprene-styrene block copolymer; such silicon-containing soft polymers as dimethyl polysiloxane, diphenyl polysiloxane; such acrylic-based soft polymers as poly(butyl acrylate), poly(butyl methacrylate), poly(hydroxyethyl methacrylate); such vinyl-based soft polymers as polyvinyl alcohol, poly(vinyl acetate), vinyl acetate-styrene copolymer; such epoxy-based soft polymers as poly(ethylene oxide), poly(propylene oxide), epichlorohydrin rubber; such fluorine-based soft polymers as vinylidene fluoride rubber, ethylene tetrafluoride-propylene rubber; and natural rubber, polypeptides, proteins, polyester based thermoplastic elastomer, vinyl chloride based thermoplastic elastomer, polyamide based thermoplastic elastomer, and other soft polymers.

These soft polymers may contain crosslinked structure, and may have functional groups introduced through denaturation reaction. Among the soft polymers, the diene based soft polymers are preferable; particularly, the hydrogenated products thereof hydrogenated in the carbon-carbon unsaturated bonds are excellent with respect to the rubber elasticity, mechanical strength, flexibility, and dispersibility.

The blend amounts of the soft polymers are different depending on the compound type. In general, when the blend amount of the soft polymer is too large, the block copolymer is so largely degraded in the glass transition temperature and transparency that the block copolymer cannot be used for such molded objects needing transparency as an optical waveguide. When the blend amount of the soft polymer is too small, sometimes the white turbidity occurs in the molded objects at high temperatures and high humidities. The blend amount is usually 0.01 to 10 parts by weight, preferably 0.02 to 5 parts by weight, particularly preferably 0.05 to 2 parts by weight in relation to 100 parts by weight of the block copolymer.

Alcoholic Compounds

The alcoholic compound is a compound which has at least one nonphenolic hydroxy group within a molecule, and suitably at least one hydroxy group and at least one ether bond or one ester bond.

As specific examples of such alcoholic compounds, there can be cited, for example, preferably a polyhydric alcohol higher than monohydric alcohol, more preferably a polyhydric alcohol higher than a dihydric alcohol, and further preferably an alcoholic ether or ester compound which is a polyhydric alcohol having 3 to 8 hydroxy groups and one thereof is etherified or esterified, respectively.

Such alcoholic compounds include, for example, such polyalcoholic esterified compounds as glycerin monostearate, glycerin monolaurate, glycerin monobeherate, diglycerin monostearate, glycerin distearate, glycerin dilaurate, pentaerythritol monostearate, pentaerythritol monolaurate, pentaerythritol monobeherate, pentaerythritol distearate, pentaerythritol dilaurate, pentaerythritol tristearate, dipentaerythritol distearate; 3-(octyloxy)-1,2-propanediol, 3-(decyloxy)-1,2-propanediol, 3-(lauryloxy)-1,2-propanediol, 3-(4-nonylphenyloxy)-1,2-propanediol, 1,6-dihydroxy-2,2-di(hydroxymethyl)-7-(4-nonylphenyloxy)-4-oxoheptane, an alcoholic ether compound obtained from the reaction of the condensate between (p-nonylphenyl)ether and formaldehyde with glycidol, an alcoholic ether compound obtained from the reaction of the condensate between (p-octylphenyl)ether and formaldehyde with glycidol, an alcoholic ether compound obtained from the reaction of the condensate between (p-octylphenyl)ether and dicyclopentadiene with glycidol.

These polyhydric alcohols are used each alone or in combination two or more thereof. The molecular weights of these polyhydric alcohols are not particularly limited; and the polyhydric alcohols, in which the molecular weights are usually 500 to 2,000, preferably 800 to 1,500, are preferable in view of the small degradation of the transparency.

The blend amounts of the above described alcoholic compounds are different depending on the compound type. In general, when the blend amount of the alcoholic compound is too large, the block copolymer is so largely degraded in the glass transition temperature and transparency that the block copolymer tends to be inappropriate for use as the optical material. When the blend amount of the alcoholic compound is too small, sometimes the white turbidity occurs in the molded objects at high temperatures and high humidities. The blend amount of the alcoholic compound is usually 0.01 to 10 parts by weight, preferably 0.02 to 5 parts by weight, particularly preferably 0.05 to 2 parts by weight in relation to 100 parts by weight of the block copolymer.

Organic or Inorganic Fillers

As for the organic or inorganic filler used in the present invention, there is no particular limitation; those fillers usually used in the field of polymer industry can be used. The organic fillers include common organic polymer grains, crosslinked polymer grains, and the like. The inorganic fillers include the following metal compounds: oxides, hydroxides, sulfides, nitrides, halides, carbonates, sulfates, phosphates, phosphites, silicates, borates, and the like.

4. Molding Methods:

The methods of blending the above described compounding agents include, for example, such a kneading method in which the block copolymer is melted and kneaded with the compounding agents by a mixer, a biaxial kneading machine, a roll, a brabender, or an extruder; and such a method in which the block copolymer and compounding agents are dissolved in an appropriate solvent and dispersed, and then coagulated. When a biaxial kneading machine is used, the kneaded object is extruded as strands, and often used as pellets by cutting with a pelletizer.

The block copolymer or the composition thereof obtained by the above described methods is molded into molded objects, which can be used for a variety of uses. As for the molding method, there is no particular limitation; it is preferable to use the melt molding method for the purpose of obtaining the molded objects excellent in the low birefringence, mechanical strength, dimensional precision, and the like. The melt molding method includes the injection molding method, extrusion molding method, press molding method, blow molding method, and the like; the injection molding method is preferable from the view point of the low birefringence and dimensional stability.

The molding conditions are selected appropriately according to the purpose of use and the molding method; when the injection molding method is used, the melting temperature of the block copolymer is appropriately selected usually in the range from 150 to 400-C., preferably in the range from 200 to 350° C., more preferably in the range from 230 to 330° C. When the resin temperature is excessively low, the fluidity is degraded, surface sink and strains are generated in the molded object, while when the resin temperature is excessively high, the defective molding possibly occurs in such a way that silver streaks are generated owing to the thermal decomposition of the resin, and the molded object suffers from yellow discoloration.

The molded object can be used in a variety of shapes such as a shape of sphere, rod, plate, solid cylinder, tube, fiber, film, or sheet.

The block copolymer (inclusive of the composition thereof) can be turned into a laminated material having one or more layers of the block copolymer composition. The laminated material can be obtained by (1) a method in which two or more sheets of the plate, film, or sheet molded objects are bonded to each other, (2) a method in which a plate, film, or sheet molded object is laminated with a layer of other materials such as a metal, a resin, and a paper, (3) a method in which the block copolymer and another thermoplastic resin are simultaneously subjected to a hot melt molding (coextrusion), and other methods.

The above described molded object and laminated material are excellent in transparency, low birefringence, mechanical strength, heat resistance, low water absorption property, and the like, and hence can be used in a variety of uses.

Specific examples of the molded object inclusive of the laminated material include such information recording mediums as optical information recording mediums and magnetic recording mediums.

Additionally, specific examples wherein the block copolymer of the present invention is used include information recording medium substrates, optical waveguides for liquid crystal displays, liquid crystal substrates, optical diffusion plates for liquid crystal displays, optical cards, optical films, optical lenses, wrapping materials, containers, medical appliances, electronic parts such as print substrates.

Specific examples of optical lenses include imaging lenses and finder lenses for cameras, pickup lenses for optical disks, fθ lenses for laser beam printers, sensor lenses, and the like.

Specific examples of optical film include polarization film, phase difference film, light diffusion film, and the like.

Specific examples of wrapping materials include wrap film, stretch film, shrink film, press-through package, blister package, tetrahedron pack, and the like.

Specific examples of containers include containers for medical drugs (inclusive of vials), containers for chemical solutions used in semiconductor production, containers for cosmetics, and the like.

Specific examples of medical appliances include various medical test cells such as blood test cells, injection syringes, prefilled syringes, and the like.

As other examples of uses, there can be cited pipes, tubes, and the like.

Specific examples of information recording mediums include such optical disks as compact disks (CD), read only optical disks (CD-ROM), write-once-read-many optical disks (WORM, CD-R), rewritable optical disks (MO; magneto-optical disks), minidisks (MD), digital video disks (DVD); optical cards; optical information recording mediums such as optical memories; and such magnetic recording mediums as plastic hard disks.

Optical Information Recording Mediums

The block copolymer of the present invention is suitable for optical information recording mediums. An optical information recording medium may take either a form having one layer of the block copolymer of the present invention or a form having two or more layers of the block copolymer of the present invention, and may adopt either the substrate surface incidence method (a mode wherein the laser light beam for recording and playback is incident from the substrate side) or the film surface incidence method (a mode wherein the laser light beam is incident from the recording film surface side).

Optical Waveguides

An optical waveguide can be obtained by molding the block copolymer containing the polymer block [A] containing the repeating unit [1] represented by the following formula (1),

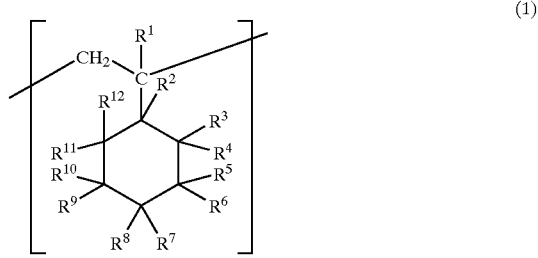

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom, and the block [B]

containing at least one repeating unit selected from the group consisting of the repeating unit [4] represented by the following formula (4),

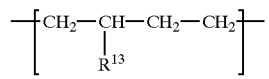 (4)

where $R^{13}$ represents a hydrogen atom or an alkyl group having 1 to 20 carbon atoms, and the repeating unit [5] represented by the following formula (5),

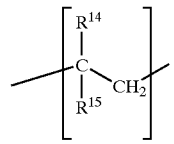 (5)

where $R^{14}$ and $R^{15}$ each represents independently a hydrogen atom or an alkyl group having 1 to 20 carbon atoms.

It is preferable that the polymer block [B] further contains the repeating unit [1], and the molar fraction a (mol %) of the repeating unit [1] in the polymer block [A] and the molar fraction b (mol %) of the repeating unit [1] in the polymer block [B] satisfy the relationship represented by a>b.

It is preferable that in the polymer block [A], the content of the repeating unit [1] therein is 50 mol % or more, and in the polymer block [B], the molar fraction $m_2$ (mol %) of the repeating unit [4] therein and the molar fraction $m_3$ (mol %) of the repeating unit [5] therein satisfy the relationship represented by the following expression:

$$2 \times m_2 + m_3 \geq 2 \text{(mol \%)}.$$

It is preferable that in the block copolymer, the ratio $(m_a : m_b)$ between ma representing the total number of moles of all the repeating units constituting the polymer block [A] and $m_b$ representing the total number of moles of all the repeating units constituting the polymer block [B] falls within the range from 5:95 to 95:5.

It is preferable that the block copolymer further contains an antiaging agent of 0.001 to 5 parts by weight in relation to 100 parts by weight of the block copolymer.

It is preferable that the block copolymer further contains a hindered amine based light stabilizer of 0.01 to 20 parts by weight in relation to 100 parts by weight of the block copolymer.

The shape of the optical waveguide is a plate, the size thereof being as follows: the thickness is usually 0.05 to 6 mm, preferably 0.1 to 4 mm, the width is usually 50 to 400 mm, preferably 100 to 350 mm, the length is usually 50 to 350 mm, preferably 70 to 300 mm. Additionally, the optical waveguide may be a wedge shaped one with the thickness gradually varying along the direction of length.

Specific examples of the optical waveguide include an optical waveguide for use in a surface light emitting illumination device used for the back light or front light in a liquid crystal display (LCD). Nowadays, the LCD comes into wide use as the displays in computers and car navigation systems. The display based on LCD is inconvenient for the use in a dark place, because the LCD itself is not illuminant. Accordingly, for the purpose of improving the visibility and enabling the use in a dark place, the surface light emitting illumination device has been developed which illuminates uniformly the display member of an LCD; in a light transmittance type LCD, there is used a back light type which illuminates from the back surface of the display surface, while in a reflection type LCD, there is used a front type which illuminates from the front surface of the display member.

The surface light emitting illumination device is classified broadly into two types according to the arrangement of the light source in relation to the display surface; one is the edge type, and the other is the directly underneath display surface type. For the case of a back light type, either the edge type or the directly underneath display surface type can be selected, according to the purpose of use; for the case of a front type, the edge type is used.

FIG. 1 shows a sectional view of an example of an edge type back light; a reflection layer 2 for randomly reflecting light is arranged on the backside of a transparent optical waveguide 1; a beam of light from a light source 4 (for example, a cold cathode tube) arranged on the side of the optical waveguide 1 is randomly reflected or scattered by the reflection layer 2, and collected on the liquid crystal display panel side (the upper side in the figure). According to need, a diffusion plate 3 is arranged on the liquid crystal display panel side surface of the optical waveguide 1. Furthermore, above the diffusion plate 3, a light collecting plate (unshown in the figure) is arranged, as the case may be. According to need, a reflection plate can be arranged under the reflection layer 2.

There is no particular limitation to the molding method of the optical waveguide; the melt molding method is preferable in order to obtain an optical waveguide excellent in mechanical strength, dimensional precision, and the like. As the melt molding method, the injection molding method, extrusion molding method, press molding method, blow molding method, and the like can be cited; the injection molding method is preferable from the viewpoint of the mechanical strength, dimensional stability, and the like. The molding conditions can be selected appropriately according to the purpose of use and the molding method; when the injection molding method is adopted, the melting temperature of the block copolymer is appropriately selected usually in the range from 150 to 400° C., preferably in the range from 200 to 350° C., more preferably in the range from 230 to 330° C. When the resin temperature is excessively low, the fluidity is degraded, surface sink and strains are generated in the optical waveguide, while when the resin temperature is excessively high, the defective molding possibly occurs in such a way that silver streaks are generated owing to the thermal decomposition of the resin, and the optical waveguide suffers from yellow discoloration.

The optical waveguide of the present invention obtained as described above has at least one of the end faces along the direction of width as the light incidence face, on which usually a cold cathode tube serving as a light source is arranged; and is subjected to the treatment of one side of a wide surface other than the end faces for the purpose of reflecting the light beam from the light incidence face; thus being used as the back light for an LCD and the like. The optical waveguide of the present invention is excellent in transparency, heat resistance, and mechanical strength, and hence is suitable for the back light in such an LCD, among LCD's, as used in a personal computer display, a car television set, a car navigation system, and the like.

Film and Sheet

The film or sheet of the present invention is produced by molding the block copolymer containing the polymer block [A] containing the repeating unit [1] represented by the following formula (1),

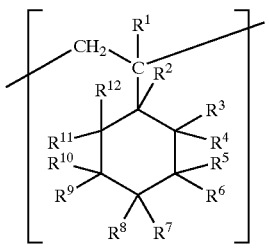
(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom, and the block [B] containing at least one repeating unit selected from the group consisting of the repeating unit [4] represented by the following formula (4),

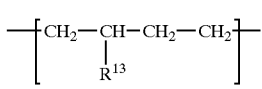
(4)

where $R^{13}$ represents a hydrogen atom or an alkyl group having 1 to 20 carbon atoms, and the repeating unit [5] represented by the following formula (5),

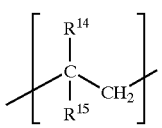
(5)

where $R^{14}$ and $R^{15}$ each represents independently a hydrogen atom or an alkyl group having 1 to 20 carbon atoms.

It is preferable that the polymer block [B] further contains the repeating unit [1], and the molar fraction a (mol %) of the repeating unit [1] in the polymer block [A] and the molar fraction b (mol %) of the repeating unit [1] in the polymer block [B] satisfy the relationship represented by a>b.

It is preferable that in the polymer block [A], the content of the repeating unit [1] therein is 50 mol % or more, and in the polymer block [B], the molar fraction $m_2$ (mol %) of the repeating unit [4] therein and the molar fraction $m_3$ (mol %) of the repeating unit [5] therein satisfy the relationship represented by the following expression:

$2 \times m_2 + m_3 \geq 2$ (mol %).

It is preferable that in the block copolymer, the ratio ($m_a$:$m_b$) between $m_a$ representing the total number of moles of all the repeating units constituting the polymer block [A] and $m_b$ representing the total number of moles of all the repeating units constituting the polymer block [B] falls within the range from 5:95 to 95:5.

Either the film thickness or the sheet thickness is usually 1 μm to 10 mm. As for the distinction between film and sheet, there is no particular standard; usually an object having the thickness of 5 to 500 μm is classified as film, and an object having the thickness of 500 μm or more is classified as sheet, while an object having the thickness in the range from 100 to 500 μm may be classified as sheet. The film or sheet of the present invention can appropriately select an optimal thickness range within the above described thickness range according to the purpose of use and the like; the optimal thickness range is selected preferably within the range from 5 μm to 5 mm, more preferably within the range from 10 μm to 2 mm.

As for the molding method of film or sheet, there is no particular limitation; either the hot melt molding method or the solution flow casting method can be used. The hot melt molding method is in more detail classified into the extrusion molding method, press molding method, inflation molding method, injection molding method, blow molding method, drawing molding method, and the like. Among these methods, the extrusion molding method, inflation molding method, and press molding method are preferable for the purpose of obtaining film or sheet excellent in mechanical strength, surface precision, and the like.

The molding conditions are selected appropriately according to the purpose of use and the molding method; when the hot melt molding method is adopted, the melting temperature of the block copolymer is appropriately selected usually in the range from 150 to 400° C., preferably in the range from 200 to 3.50° C., more preferably in the range from 230 to 330° C. When the resin temperature is excessively low, the fluidity is degraded, surface sink and strains are generated in the film and sheet, while when the resin temperature is excessively high, the defective molding possibly occurs in such a way that voids and silver streaks are generated owing to the thermal decomposition of the resin, and the film and sheet suffer from yellow discoloration.

The film and sheet of the present invention are excellent in heat resistance, transparency, and mechanical strength, and accordingly can be used for a variety of uses in the field of civil engineering and construction, field of medical care, field of food industry, and the like; among these, the film and sheet of the present invention can be suitably used for the optical uses and wrapping uses.

As for the optical uses, there can be cited such liquid crystal display element (LCD) components as a phase difference film, a polarization film, a liquid crystal substrate, and the like; such LCD back light components as a light diffusion sheet, a light collecting sheet, and the like; such an optical information medium substrate as an optical card, an optical disk, and the like; such an optical film or an optical sheet as a plate lense including a Fresnel lens and a Renticular lens.

As for the wrapping uses, there can be cited wrap film, stretch film, shrink film, press-through package film, blister package film, and the like.

The film and sheet of the present invention can also be used for such uses for medical drugs and the like as infusion solution bags, drip medicine bags, drug solution bags, and the like.

Containers

The container of the present invention is produced by molding the block copolymer containing the polymer block [A] containing the repeating unit [1] represented by the following formula (1),

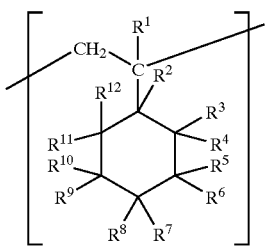
(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom, and the block [B] containing at least one repeating unit selected from the group consisting of the repeating unit [4] represented by the following formula (4),

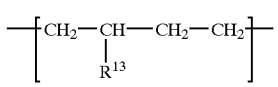
(4)

where $R^{13}$ represents a hydrogen atom or an alkyl group having 1 to 20 carbon atoms, and the repeating unit [5] represented by the following formula (5),

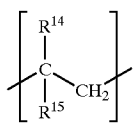
(5)

where $R^{14}$ and $R^{15}$ each represents independently a hydrogen atom or an alkyl group having 1 to 20 carbon atoms.

It is preferable that the polymer block [B] further contains the repeating unit [1], and the molar fraction a (mol %) of the repeating unit [1] in the polymer block [A] and the molar fraction b (mol %) of the repeating unit [1] in the polymer block [B] satisfy the relationship represented by a>b.

It is preferable that in the polymer block [A], the content of the repeating unit [1] therein is 50 mol % or more, and in the polymer block [B], the molar fraction $m_2$ (mol %) of the repeating unit [4] therein and the molar fraction $m_3$ (mol %) of the repeating unit [5] therein satisfy the relationship represented by the following expression:

$$2 \times m_2 + m_3 \geq 2 (\text{mol \%}).$$

It is preferable that in the block copolymer, the ratio ($m_a:m_b$) between $m_a$ representing the total number of moles of all the repeating units constituting the polymer block [A] and $m_b$ representing the total number of moles of all the repeating units constituting the polymer block [B] falls within the range from 5:95 to 95:5.

The outer shape of the container of the present invention is not particularly limited, and can be selected according to the purpose of use, as a box shape, tubular shape, spherical shape, tray shape, bottle shape, and the like. The projected plan form of the container is not limited, and can take such a variety of forms as a regular tetragon, rectangle, parallelogram, pentagon, hexagon, polygon, circular form, elliptical form, and the like. The container of the present invention may be either accompanied with a lid or open.

When the container has a lid, the lid may take a detachable form, or a reclosable form under favor of a hinge. As for the detachable lid, there can be cited a form wherein the lid covers and fits the upper portion of the container body, a form wherein the peripheral inside of the lid and the outside of the top end portion of the container body are provided with screw threads so as to mesh together with each other and the lid is fixed to the container body, a form wherein the lid is simply put on the top end of the container body, and other forms.

The volume of the container of the present invention is not particularly limited; the larger outer size of the plan view outer size and the side view outer size is preferably 50 to 2,000 mm, more preferably 100 to 1,500 mm.

The resin layer thickness of the container is preferably 1 μm to 10 mm, more preferably 5 μm to 5 mm, particularly preferably 10 μm to 2 mm. Within the above described thickness ranges, an optical thickness range can be appropriately selected, according to the purpose of use and the like.

As for the molding method of the container, there is no particular limitation and a variety of molding methods can be used. For example, as the methods of directly molding the container from the block copolymer pellets, there can be cited the injection molding method, blow molding method, and the like; additionally, there can be cited the production method of the container wherein a sheet is once formed by the injection molding method, extrusion molding method, inflation molding method, and the like, and then the container is produced from the sheet by the press molding method.

As far as the effects of the present invention are not impaired, it is possible to mold a container made of a laminated material on the basis of the press molding method by using, for example, a laminate sheet made of the block copolymer related to the present invention and such other resins as the chain polyolefins including polyethylene, polypropylene, and the like; the norbornene based polymers; poly(vinylidene fluoride), and the like.

The molding conditions are appropriately selected according to the purpose of use and the molding method; the melting temperature of the block copolymer is appropriately selected preferably in the range from 150 to 400° C., more preferably in the range from 200 to 350° C., particularly preferably in the range from 230 to 330° C. When the resin temperature is excessively low, the fluidity is degraded, surface sink and strains are generated in the container, while when the polymer temperature is excessively high, the defective molding possibly occurs in such a way that voids and silver streaks are generated owing to the thermal decomposition of the polymer, and the container suffers from yellow discoloration.

The container of the present invention is excellent in heat resistance and transparency, and additionally large in such mechanical strengths as the tensile strength, bending strength, and the like, and high in toughness; and accordingly the container can be used for taking in goods for the purpose of preservation, transportation, display, storage, and the like, in a variety of fields and uses such as the fields of medical care, food industry, daily commodities, and other industrial uses.

In the field of medical care, there can be cited such containers for medical drugs as phials, ampoules, vials, and the like; such sampling containers as test tubes, blood collecting tubes, specimen containers, and the like; such medical appliances as prefilled syringes, injection syringes, and the like; and such laboratory containers as beakers, petri dishes, flasks, centrifugal tube, and the like.

In the field of food industry, such liquid containers as drink bottles, seasoning bottle, and the like; such food containers as taking in prepared food, confections, ice cream, and the like; such food containers as food trays, transparent packs, cold lunch boxes, and the like; such food vessels as cups, small bowls, medium bowls, bowls, plates, and the like.

In the field of daily commodities, there can be cited a variety of containers taking in various goods such as clothes cases, dole cases, toy cases, writing material cases, document trays, kitchen utensils cases, water vessels, flower cases, and the like.

The container of the present invention is useful as the industrial containers for supplying and storing the primary and secondary raw materials, the materials for maintaining instruments, and the like, in a variety of manufacturing plants, cooking places, and the like.

Optical Lenses

The optical lens of the present invention is produced by molding the block copolymer containing the polymer block containing the repeating unit [1] represented by the following formula (1),

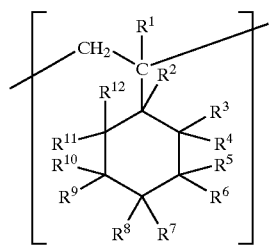

(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom, and at least one repeating unit selected from the group consisting of the repeating unit [4] represented by the following formula (4),

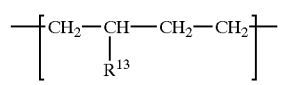

(4)

where $R^{13}$ represents a hydrogen atom or an alkyl group having 1 to 20 carbon atoms, and the repeating unit [5] represented by the following formula (5),

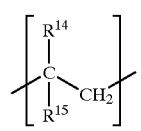

(5)

where $R^{14}$ and $R^{15}$ each represents independently a hydrogen atom or an alkyl group having 1 to 20 carbon atoms; and in which block copolymer, the molar fraction a (mol %) of the repeating unit [1] in the polymer block [A] and the molar fraction b (mol %) of the repeating unit [1] in the polymer block [B] satisfy the relationship represented by a>b.

As for the block copolymer, it is preferable that in the polymer block [B], the molar fraction $m_2$ (mol %) of the repeating unit [4] therein and the molar fraction $m_3$ (mol %) of the repeating unit [5] therein satisfy the relationship represented by the following expression:

$$2 \times m_2 + m_3 \geq 2 (\text{mol \%}).$$

It is preferable that in the block copolymer, the ratio $(m_a:m_b)$ between $m_a$ representing the total number of moles of all the repeating units constituting the polymer block [A] and $m_b$ representing the total number of moles of all the repeating units constituting the polymer block [B] falls within the range from 40:60 to 90:10.

The shape of the optical lens of the present invention is not particularly limited, as far as when such a beam of light having a continuous wavelength distribution as the sunlight, or such a beam of light having a single wavelength as a beam of laser light is incident on the lens, the lens has a function to alter the optical path of the beam of light. Specific examples include a prism lens constructed on a flat main body and having a function of refracting light beam; such lenses having a focal point and a function to converge the beam of light to the focal point as biconvex lenses, plano-convex lenses, and meniscus-convex lenses; such lenses having a focal point and a function to diverge the beam of light from the focal point as biconcave lenses, plano-concave lenses, and meniscus-concave lenses; and such lenses provided with fine concavities and convexities on flat planes as Fresnel lenses and Renticular lenses.

The block copolymer used in the present invention can yield molded objects large in mechanical strength, and accordingly makes it possible to produce the lenses having such shapes as are downsized and made uneven in thickness, or are larger and thinner, as compared to the conventional optical lenses. The characteristics which the lens of the present invention is required to have are as follows: the transparency (light transmittance) is preferably 80% or more for an optical length of 1 mm, more preferably 85% or more; as for the birefringence, the retardation value of the central portion of an injection molded plate of 3 mm in thickness is preferably 100 mm or less; the bending strength is preferably 400 kgf/cm$^2$ or more, more preferably 500 kgf/cm$^2$ or more.

Figure 2:
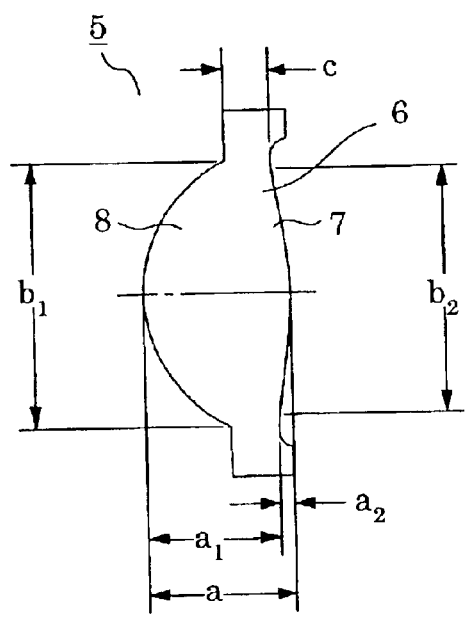
FIG. 2 is a schematic sectional view of a pickup lens for use for a magneto-optical disk which is one embodiment of the optical lens according to the present invention.
Figure 3:
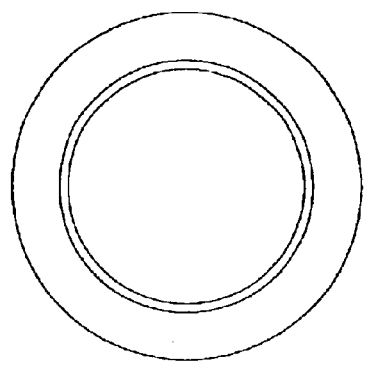
FIG. 3 is a plan view of the optical lens shown in FIG. 2.

The embodiments of the lens of the present invention will be described below with reference to the drawings. FIG. 2 is a schematic sectional view showing an optical lens related to one embodiment of the present invention, and FIG. 3 is a plan view of FIG. 2. As for the present embodiment, description will be made of a pickup lens, exemplified as an optical lens, for use in a signal reading device for a magneto-optical disk.

As FIG. 2 shows, the pickup lens 5, as an example of the lens related to the present embodiment, has a lens body 6.

The lens body 6 is composed of a first effective portion 8 which is the effective portion of a first surface, a second effective portion 7 which is the effective portion of a second surface, and the other portions.

In the present embodiment, the diameter $b_1$ of the first effective portion 8 and the diameter $b_2$ of the second effective portion, both of the lens body 4, each is preferably 2 to 4 mm. The total thickness a of the central portion of the effective portion in the lens body 6 is the sum of the central thickness $a_1$ of the first effective portion and the central thickness $a_2$ of the second effective portion, and is preferably 1 to 2 mm. The minimal thickness of the lens body 4, that is, the thickness c of the peripheral portion of the effective portions 6, is preferably 0.3 to 0.8 mm.

In the present embodiment, the lens 5 is constituted with a special resin, and accordingly it can be fabricated without the apprehension of birefringence in a manner downsized and made uneven in thickness, as compared to the conventional lenses. Furthermore, as described above, the lens 5 has the mechanical strength with which the molding into a thin shape is permitted. Incidentally, in a conventional lens, the diameter of the effective portion is limited to the range from 6 to 8 mm, the total thickness of the central portion is limited to the range from 3 to 4 mm, and the peripheral thickness of the effective portion is limited to the range from 2.5 to 3 mm.

Figure 4:
FIG. 4 is a schematic sectional view of a conventional fθ lens for use in a laser printer.
Figure 5:
FIG. 5 is an oblique perspective view of the optical lens shown in FIG. 4.
Figure 6:
FIG. 6 is a schematic sectional view of an upsized thin fθ lens which is a second embodiment of the optical lens according to the present invention.
Figure 7:
FIG. 7 is an oblique perspective view of the optical lens shown in FIG. 6.
Figure 8:
FIG. 8 is a schematic sectional view of an fθ lens, downsized and made uneven in thickness, which is a third embodiment of the optical lens according to the present invention.
Figure 9:
FIG. 9 is an oblique perspective view of the optical lens shown in FIG. 8.

As can be seen from the fθ lens for a laser printer as another embodiment of the optical lens related to the present invention, the present invention can meet either the need for upsizing and making thinner or the need for downsizing and making uneven in thickness, these needs being in a contrast to the conventional thick and stacked set of plano-convex lenses (FIG. 4 is a schematic sectional view thereof, and FIG. 5 is an oblique perspective view thereof). FIG. 6 is a schematic sectional view of the upsized thin single-layer fθ lens according to the present invention. FIG. 7 is an oblique perspective view of the lens shown in FIG. 6. The block copolymer composing the optical lens of the present invention is large in mechanical strength, and accordingly it is possible to mold even a single-layer thin upsized lens. Additionally, FIG. 8 is a schematic sectional view of an fθ lens, downsized according to the present invention. FIG. 9 is an oblique perspective view of the lens shown in FIG. 8. The block copolymer composing the optical lens of the present invention is of the low birefringence, and accordingly the unevenness in thickness increased by downsizing can be compatible with the practicability.

The shape and size of the optical lens of the present invention are not limited; in the case of a convex lens having the circular plan view shape, the central total thickness a, the diameter of the effective portion b, and the peripheral thickness of the effective portion c, when c ranges from 0.3 to 0.8 mm, the diameter a is usually 0.5 to 2.5 mm, preferably 1 to 2 mm, more preferably 1.5 to 2 mm. Additionally, the unevenness in thickness of a lens, in terms of the a/(bc), can be usually 0.1 to 4.5, preferably 0.3 to 1.5.

As for the molding method of the optical lens, there is no particular limitation, and a variety of molding methods can be used. For example, the methods of directly molding optical lenses from the block copolymer pellets include the injection molding method, extrusion molding method, and compressive molding method, and the like.

The molding conditions are appropriately selected according to the purpose of use and the molding method; the melting temperature of the block copolymer is appropriately selected preferably in the range from 150 to 400° C., more preferably in the range from 200 to 350° C., and particularly preferably in the range from 230 to 330° C. When the resin temperature is excessively low, there is an apprehension that the fluidity will be degraded, and accordingly the residual stress will be generated to increase the refractive index, while when the polymer temperature is excessively high, there is an apprehension that the voids will be generated owing to the thermal decomposition of the polymer, and the defective mold releasing will occur.

The optical lens of the present invention is excellent in transparency, low birefringence, and heat resistance; and the material thereof, the block copolymer, contains the block [A] of hard segment and the block [B] of soft segment, and hence the lens is large in the mechanical strengths such as bending strength, tensile strength, and the like. Accordingly, the lens can meet a variety of needs such as need for downsizing and making uneven in thickness, need for upsizing and making thinner, and the like, in the following various lenses: a prism lens for finder in a common camera; such whole light transmittance lenses as an image lens in a common camera, an image lens in a video camera, an image lens in a digital camera, an eyeglass lens, a telescope lens, a binocular lens, a magnifying lens, a microscope lens, an endoscope lens, and the like; such optical disk pickup lenses as used for CD, CD-ROM, WORM (write-once-read-many optical disk), MO (rewritable optical disk, magneto-optical disk), MD (minidisk), and the like; such laser scanning lenses as an fθ lens for a laser printer, a sensor lens, and the like.

Incidentally, the block copolymers used for producing the molded objects in the present invention are all have the weight average molecular weights, molecular weight distributions, glass transition temperatures, block structures, and the like, all similar to those in the above described novel block copolymers; and are excellent in transparency, mechanical strength, heat resistance, and the like. It is preferable that the block copolymers used for producing the molded objects are the above defined novel block copolymers.

EXAMPLES

More specific description will be made below of the present invention with reference to the Production Examples, Examples, and Comparative Examples. All designations of "part" or "parts" and "%" as will be used in these examples mean part or parts by weight and wt % unless otherwise specified. The present invention is not limited only to these Production Examples and Examples.

Various physical properties were determined according to the following methods:

(1) Molecular Weight of a Block Copolymer

The weight average molecular weight (Mw) was determined in terms of a standard polystyrene value as measured by GPC using tetrahydrofuran (THF) as a solvent.

(2) Molecular Weight Distribution

The weight average molecular weight (Mw) and number average molecular weight (Mn) were determined in terms of a standard polystyrene value as measured by GPC using tetrahydrofuran (THF) as a solvent, and then the ratio (Mw/Mn) between the weight average molecular weight (Mw) and the number average molecular weight (Mn) was calculated.

(3) Glass Transition Temperature (Tg)

Measurements were made on the basis of JIS K7121 and by DSC, and the glass transition temperature Tg was determined as the value of the block copolymer obtained from the transition point on the high temperature side.

(4) Hydrogenation Rate

The hydrogenation rates in the main chain and aromatic rings in the block copolymer were determined by the $^1$H-NMR measurements.

(5) Birefringence Value

An optical disk substrate of 85 mm in diameter was molded, and the birefringence value at a location 25 mm away from the substrate center was measured by a polarizing microscope (manufactured by NIKON Corp.; 546 S ënarmont compensator). A value of 5 nm or less is represented by ⊚, a value larger than 5 nm and not larger than 10 nm is represented by ○, and a value larger than 10 nm is represented by x.

(6) Light Transmittance

The light transmittance of an optical disk substrate was measured on a visible spectrophotometer (manufacture by JASCO Corp.; U-30).

(7) Bending Strength

A test specimen of 127 mm in length, 12.7 mm in width, and 3 mm in thickness was molded by an injection molding machine, and the bending strength thereof was measured on a Strograph (Toyo Seiki Seisaku-Sho, Ltd.; V10-B) based on ASTMD 790. A case where the yield point strength or the breaking point strength was 500 kgf/cm² or more is represented by ⊚, a case where the breaking point strength was smaller than 500 kgf/cm² and 400 kgf/cm² or more is represented by ○, and a case where the breaking point strength was smaller than 400 kgf/cm² is represented by x.

(8) Heat Resistance of an Optical Waveguide

A light reflection sheet is arranged on one side of the largest surfaces of an optical waveguide, the end surface of 2.5 mm in thickness is chosen as the light incidence face, a high intensity cold cathode tube and a lamp reflector were arranged on the end surface side; and subsequently, the cold cathode tube was on continuously for 1,500 hours, and the deformation in the light incidence face was visually observed.

(9) Transparency of an Optical Waveguide

The light transmittance of an optical waveguide (optical path length 250 mm) was measured on a visible spectrophotometer (JASCO Corp.; U-30).

(10) Film Thickness

A piece of film was held tightly and fixed with a metal clamp, and was cut out in a manner to give a flat section; the section was observed with an optical microscope (×200) to measure the thickness values of the individual layers.

(11) Heat Resistance of Film

The softening temperature was measured in conformity with JIS K7196. A softening temperature lower than 100° C. is represented by x, a softening temperature of 100° C. or higher and lower than 120° C. is represented by ○, and a softening temperature of 120° C. or higher is represented by ⊚.

(12) Transparency of Film

The optical transmittance (%) was measured on a spectrophotometer, by continuously changing the wavelength over the wavelength range from 400 to 900 nm, and the smallest measured transmittance was taken as the optical transmittance of the film. The higher the optical transmittance is, the higher the transparency is. The evaluations standards are as follows: the transmittance of 92% or higher is represented by ⊚ (very good), the transmittance of 88% or higher and lower than 92% is represented by ○ (good), and the transmittance lower than 88% is represented by x (poor).

(13) Tear Strength of Film

The tear strength was measured in conformity with JIS K7128. The tear strength smaller than 10 kgf/mm is represented by x, the tear strength of 10 kgf/mm or more and smaller than 20 kgf/mm is represented by;, and the tear strength of 20 kgf/mm or more is represented by T.

(14) Tensile Elastic Modulus of Film

The tensile elastic modulus was measured in conformity with JIS K7127. The modulus smaller than 10,000 kgf/cm² is represented by x, the modulus of 10,000 kgf/cm² or more and smaller than 20,000 kgf/cm² is represented by ○, and the modulus of 20,000 kgf /cm² or more is represented by ⊚.

(15) Injection Moldability of a Container

The injection molded containers were evaluated by observation, and the results are represented as follows:
  ⊚: Surface sink, warping, and fins are completely absent.
  ○: Surface sink, warping, or fins are so low in degree that the molded container is acceptable as a molded product.
  x: Surface sink, warping, or fins are conspicuous.

Heat Resistance of a Container

(16) A test specimen cut out from an injection molded container of 5 mm in longitudinal length, 5 mm in transverse length, and 1 mm in thickness was subjected to the softening temperature measurement on a TMA (manufactured by Seiko Instruments, Inc.; SSC5200), and the evaluation results are represented by the symbols defined on the basis of the following standards:
  ⊚: 130° C. or higher; ○: 110 to 130° C.; x: lower than 110° C.

(17) Transparency of a Container (Light Transmittance)

The optical transmittance was measured on a visible spectrophotometer, by continuously changing the wavelength over the wavelength range from 400 to 900 nm, and the smallest measured transmittance was taken as the optical transmittance of the container. The evaluation results are represented by the symbols defined on the basis of the following standards:
  ⊚: 90% or higher; ○: 85% or higher and lower than 90%; x: lower than 85%.

(18) Bending Strength of a Container

A test specimen cut out from an injection molded container of 15 mm in longitudinal length, 60 mm in transverse length, and 1 mm in thickness was subjected to the bending strength measurement on an autograph AGS-D (manufactured by Shimadzu, Corp.) under the conditions that the distance between the supporting points was 30 mm, the load cell was 10 kW, and the load cell velocity was 5 mm/min; the evaluation results are represented by the symbols defined on the basis of the following standards:
  ⊚: 600 kgf/cm² or more
  ○: less than 600 kgf/cm² and not less than 500 kgf/cm²
  x: less than 500 kgf/cm²

(19) Bending Elastic Modulus of a Container

The bending elastic modulus obtained in the above described bending test is represented by the symbols defined on the basis of the following standards:
  ⊚: 21,000 kgf/cm² or more
  ○: less than 21,000 kgf/cm² and not less than 18,000 kgf/cm²
  x: less than 18,000 kgf/cm²

(20) Transparency of an Optical Lens (Light Transmittance)

A test specimen of 5 mm in longitudinal length, 5 mm in transverse length, and 1 mm in thickness was cut out from a piece of 1 mm thick plate obtained by molding at 200° C. using a hot press molding machine (manufactured by Tester Sangyo K.K.); the optical transmittance of the test specimen was measured on a visible spectrophotometer, by continuously changing the wavelength over the wavelength range from 400 to 900 nm, and the smallest measured transmittance was taken as the optical transmittance of the test specimen. The evaluation results are represented by the symbols defined on the basis of the following standards:
  ⊚: 88% or more; ○: less than 88% and 85% or more; x: less than 85%.

(21) Birefringence of an Optical Lens

The birefringence value (the retardation) of a piece of 3 mm thick injection molded plate was measured on a microarea refractometer (KOBRA-CCD/X) at the wavelength of 590 nm or 650 nm. The retardation value of the plate center was used for evaluation. The evaluation results are represented by the symbols defined on the basis of the following standards:
  ⊚: less than 80 nm
  ○: 80 nm or more and less than 100 nm
  x: 100 nm or more and less than 150 nm

(22) Heat Resistance of an Optical Lens

A test specimen of 5 mm in longitudinal length, 5 mm in transverse length, and 1 mm in thickness was cut out from a piece of 1 mm thick plate obtained by molding at 200° C. using a hot press molding machine (manufactured by Tester Sangyo K.K.); the softening temperature of the test specimen was measured on a TMA (manufactured by Seiko Instruments, Inc.; SSC5200), and the evaluation results are represented by the symbols defined on the basis of the following standards:

⊚: 130° C. or higher; ○: 110 to 130° C.; x: lower than 110° C.

(23) Bending Strength of an Optical Lens

A test specimen of 15 mm in longitudinal length, 60 mm in transverse length, and 1 mm in thickness was cut out from the above described 1 mm thick plate obtained by the press molding; the bending strength of the test specimen was measured on an autograph AGS-D (manufactured by Shimadzu, Corp.) under the conditions that the distance between the supporting points was 30 mm, the load cell was 10 kW, and the load cell velocity was 5 mm/min; the evaluation results are represented by the symbols defined on the basis of the following standards:

⊚: 600 kgf/cm$^2$ or more
○: less than 600 kgf/cm$^2$ and not less than 350 kgf/cm$^2$
x: less than 350 kgf/cm$^2$

(24) Bending Elastic Modulus of an Optical Lens

The bending elastic modulus obtained in the above described bending test is represented by the symbols defined on the basis of the following standards:

⊚: 21,000 kgf/cm$^2$ or more
○: less than 21000 kgf/cm$^2$ and not less than 15,000 kgf/cm$^2$
x: less than 15,000 kgf/cm$^2$ Production Example 1

Example 1 of Production Method

A stainless steel reaction vessel equipped with a stirrer, which had been sufficiently dried and purged with nitrogen, was charged with 320 parts of dehydrated cyclohexane, 28 parts of styrene monomer, and 0.40 part of dibutyl ether. While stirring the resulting mixture at 60° C., 0.30 part of n-butyllithium solution (15% hexane solution) was added to start the polymerization reaction. After one hour of polymerization reaction, the reaction solution was added with 24 parts of a monomer mixture consisting of 16 parts of styrene monomer and 8 parts of isoprene monomer, and the polymerization reaction was conducted further for an hour. Subsequently, the reaction solution was further added with 28 parts of styrene monomer, and the polymerization reaction was conducted further for an hour, and then the reaction solution was added with 0.2 part of isopropyl alcohol to terminate the reaction.

The weight average molecular weight (Mw) and molecular weight distribution (Mw/Mn) of the block copolymer thus obtained were determined as Mw=122,000 and Mw/Mn=1.06.

Then, 400 parts of the above polymerization reaction solution were transferred into an autoclave equipped with a stirrer, and the reaction solution was added and mixed with 10 parts of a silica-alumina supported nickel catalyst (manufactured by Nikki Chemical Co., Ltd.; E22U, supported content of nickel: 60%) as the hydrogenation catalyst. The interior of the autoclave was purged with hydrogen, hydrogen was supplied while the solution was being stirred, and hydrogenation reaction was conducted at 160° C. under a pressure of 4.5 MPa for 8 hours.

After completion of the hydrogenation reaction, the reaction solution was filtered to remove the hydrogenation catalyst, the filtered reaction solution was added with 800 parts of cyclohexane to be diluted, and the reaction solution was poured into 3,500 parts of isopropanol (filtered with a filter of 1 μm pore size in a clean room of class 1,000), to precipitate the block copolymer; the block copolymer was separated and recovered by filtration, and dried at 80° C. for 48 hours under a reduced pressure.

The obtained block copolymer is a ternary block copolymer which consists of the block containing the repeating unit derived from styrene (hereinafter abbreviated as St), the block containing the repeating unit derived from styrene and isoprene (hereinafter abbreviated as St/Ip), and St; and the molar ratios of the individual blocks are as follows: St:St/Ip:St=33:34(St:Ip=19:15):33. In the block copolymer, Mw is 91,200, Mw/Mn is 1.12, the hydrogenation rate of the main chain and aromatic rings is 99.9%, and the Tg is 125.5° C.

Production Example 2

Example 2 of Production Method

The same stainless steel reaction vessel as that used in Production Example 1 was charged with 320 parts of dehydrated cyclohexane, 56 parts of styrene monomer, and 0.40 part of dibutyl ether. While stirring the resulting mixture at 60° C., 0.30 part of n-butyllithium solution (15% hexane solution) was added to start the polymerization reaction. After one hour of polymerization reaction, the reaction solution was added with 24 parts of the monomer mixture consisting of 16 parts of styrene monomer and 8 parts of isoprene monomer, and the polymerization reaction was conducted further for an hour. Subsequently, the reaction solution was added with 0.2 part of isopropyl alcohol to terminate the reaction. The weight average molecular weight (Mw) and molecular weight distribution (Mw/Mn) of the obtained block copolymer were determined as Mw=131,000 and Mw/Mn=1.06.

Then, the hydrogenation reaction was conducted similarly to that in Production Example 1. The obtained block copolymer is a binary block copolymer which consists of St and St/Ip, with the individual block molar ratios of St:St/Ip=66:19/15. In the block copolymer, Mw is 92,300, Mw/Mn is 1.11, the hydrogenation rate is 99.9%, and Tg is 127.1° C.

Production Example 3

Example 3 of the Production Method

The same stainless steel reaction vessel as that used in Production Example 1 was charged with 320 parts of dehydrated cyclohexane, 3.2 parts of styrene monomer, and 0.40 part of dibutyl ether. While stirring the resulting mixture at 60° C., 0.30 part of n-butyllithium solution (15% hexane solution) was added to start the polymerization reaction. After two hours of polymerization reaction, the reaction solution was added with 76.8 parts of the monomer mixture consisting of 65.6 parts of styrene monomer and 11.2 parts of isoprene monomer, and the polymerization reaction was conducted further for an hour. Subsequently, the reaction solution was added with 0.2 part of isopropyl alcohol to terminate the reaction. The weight average molecular weight (Mw) and molecular weight distribution (Mw/Mn) of the obtained block copolymer were determined as Mw=128,000 and Mw/Mn=1.07.

Then, the hydrogenation reaction was conducted similarly to that in Production Example 1. The obtained block copolymer is a binary block copolymer which consists of St and St/Ip, with the individual block molar ratios of St:St/Ip=4:76.8/19.2. In the block copolymer, Mw is 92,300, Mw/Mn is 1.12, the hydrogenation rate is 99.9%, and Tg is 126.5° C.

Production Example 4

The same stainless steel reaction vessel as that used in Production Example 1 was charged with 320 parts of dehydrated cyclohexane, 34.4 parts of styrene monomer, and 0.40 part of dibutyl ether. While stirring the resulting mixture at 60° C., 0.30 part of n-butyllithium solution (15% hexane solution) was added to start the polymerization reaction. After one hour of polymerization reaction, the reaction solution was added with 11.2 parts of isoprene monomer, and the reaction was further conducted for an hour. Then, the reaction solution was added with 34.4 parts of styrene monomer, and the reaction was conducted further for an hour. Subsequently, the reaction solution was added with 0.2 part of isopropyl alcohol to terminate the reaction. The weight average molecular weight (Mw) and molecular weight distribution (Mw/Mn) of the obtained block copolymer were determined as Mw=119,000 and Mw/Mn=1.04.

Then, the hydrogenation reaction was conducted similarly to that in Production Example 1. The obtained block copolymer is a ternary block copolymer which consists of St, the block containing the repeating unit derived from isoprene (hereinafter abbreviated as Ip), and St, with the individual block molar ratios of St:Ip:St=40:20:40. In the block copolymer, Mw is 90,900, Mw/Mn is 1.10, the hydrogenation rate is 99.9%, and Tg is 139° C.

Production Example 5

The same stainless steel reaction vessel as that used in Production Example 1 was charged with 320 parts of dehydrated cyclohexane, 56.7 parts of a monomer mixture consisting of 28.6 parts of styrene monomer and 28.1 parts of isoprene monomer, and 0.40 part of dibutyl ether. While stirring the resulting mixture at 60° C., 0.30 part of n-butyllithium solution (15% hexane solution) was added to start the polymerization reaction. After two hours of polymerization reaction, the reaction solution was added with 23.3 parts of a monomer mixture consisting of 9.2 parts of styrene monomer and 14.1 parts of isoprene monomer, and the reaction was further conducted for an hour. Subsequently, the reaction solution was added with 0.2 part of isopropyl alcohol to terminate the reaction. The weight average molecular weight (Mw) and molecular weight distribution (Mw/Mn) of the obtained block copolymer were determined as Mw=129,000 and Mw/Mn=1.08.

Then, the hydrogenation reaction was conducted similarly to that in Production Example 1. The obtained block copolymer is a binary block copolymer which consists of St/Ip and St/Ip, with the individual block molar ratios of St/Ip:St/Ip=28:42/9:21. In the block copolymer, Mw is 92,700, Mw/Mn is 1.15, the hydrogenation rate is 99.9%, and Tg is 117.5° C.

Production Example 6

The same stainless steel reaction vessel as that used in Production Example 1 was charged with 320 parts of dehydrated cyclohexane, 64.02 parts of styrene monomer, and 0.40 part of dibutyl ether. While stirring the resulting mixture at 60° C., 0.30 part of n-butyllithium solution (15% hexane solution) was added to start the polymerization reaction. After two hours of polymerization reaction, the reaction solution was added with 15.99 parts of a monomer mixture consisting of 15.93 parts of styrene monomer and 0.06 part of isoprene monomer, and the reaction was further conducted for an hour. Subsequently, the reaction solution was added with 0.2 part of isopropyl alcohol to terminate the reaction. The weight average molecular weight (Mw) and molecular weight distribution (Mw/Mn) of the obtained block copolymer were determined as Mw=129,000 and Mw/Mn=1.05.

Then, the hydrogenation reaction was conducted similarly to that in Production Example 1. The obtained block copolymer is a binary block copolymer which consists of St and St/Ip, with the individual block molar ratios of St:St/Ip=80:19.9/0.1. In the block copolymer, Mw is 92,500, Mw/Mn is 1.12, the hydrogenation rate is 99.9%, and Tg is 140.5° C.

Production Example 7

A stainless steel reaction vessel equipped with a stirrer, which had been sufficiently dried and purged with nitrogen, was charged with 320 parts of dehydrated cyclohexane, 60 parts of styrene monomer, and 0.38 part of dibutyl ether. While stirring the resulting mixture at 60° C., 0.36 part of n-butyllithium solution (15% hexane solution) was added to start the polymerization reaction. After one hour of polymerization reaction, the reaction solution was added with 20 parts of a monomer mixture consisting of 8 parts of styrene monomer and 12 parts of isoprene monomer, and the polymerization reaction was conducted further for an hour. Subsequently, the reaction solution was added with 0.2 part of isopropyl alcohol to terminate the reaction.

The weight average molecular weight (Mw) and molecular weight distribution (Mw/Mn) of the block copolymer thus obtained were determined as Mw=102,000 and Mw/Mn=1.11.

Then, 400 parts of the above polymerization reaction solution were transferred into an autoclave equipped with a stirrer, and the reaction solution was added and mixed with 10 parts of a silica-alumina supported nickel catalyst (manufactured by Nikki Chemical Co., Ltd.; E22U, supported content of nickel: 60%) as the hydrogenation catalyst. The interior of the autoclave was purged with hydrogen, hydrogen was supplied while the solution was being stirred, and an 8 hour of hydrogenation reaction was conducted at 160° C., and under a pressure of 4.5 MPa.

After completion of the hydrogenation reaction, the reaction solution was filtered to remove the hydrogenation catalyst, the filtered reaction solution was added with 800 parts of cyclohexane to be diluted, and the reaction solution was poured into 3,500 parts of isopropanol (filtered with a filter of 1 μm pore size in a clean room of class 1000), to precipitate the block copolymer; the block copolymer was separated and recovered by filtration, and dried at 80° C. for 48 hours under a reduced pressure.

The obtained block copolymer is a binary block copolymer which consists of the block containing the repeating unit derived from styrene (hereinafter abbreviated as St) and the block containing the repeating unit derived from styrene and isoprene (hereinafter abbreviated as St/Ip); and the molar ratios of the individual blocks are as follows:. St:St/Ip=69:31 (St:Ip=10:21). In the block copolymer, Mw is 85,100, Mw/Mn is 1.17, the hydrogenation rate of the main chain and aromatic rings is 99.9%, and the Tg is 126.5° C.

Production Example 8

The same stainless steel reaction vessel as that used in Production Example 7 was charged with 320 parts of dehydrated cyclohexane, 37.5 parts of styrene monomer, and 0.38 part of dibutyl ether. While stirring the resulting mixture at 60° C., 0.36 part of n-butyllithium solution (15% hexane solution) was added to start the polymerization reaction. After one hour of polymerization reaction, the reaction solution was added with 20 parts of a monomer mixture consisting of 8 parts of styrene monomer and 12 parts of isoprene monomer, and the polymerization reaction was further conducted for an hour. Then, the reaction solution was added with 37.5 parts of styrene monomer, and the polymerization reaction was conducted further for an hour. Subsequently, the reaction solution was added with 0.2 part of isopropyl alcohol to terminate the reaction. The weight average molecular weight (Mw) and molecular weight distribution (Mw/Mn) of the obtained block copolymer were determined as Mw=101,000 and Mw/Mn=1.13.

Then, the hydrogenation reaction was conducted similarly to that in Production Example 7. The obtained block copolymer is a ternary block copolymer which consists of St, St/Ip, and St with the individual block molar ratios of St:St/Ip:St= 34.5:31(St:Ip=10:21):34.5. In the block copolymer, Mw is 84,900, Mw/Mn is 1.20, the hydrogenation rate is 99.9%, and Tg is 127.1° C.

Production Example 9

The same stainless steel reaction vessel as that used in Production Example 7 was charged with 320 parts of dehydrated cyclohexane, 57.6 parts of a monomer mixture consisting of 28.8 parts of styrene monomer and 28.8 parts of isoprene monomer, and 0.38 part of dibutyl ether. While stirring the resulting mixture at 60° C., 0.36 part of n-butyllithium solution (15% hexane solution) was added to start the polymerization reaction. After one hour of polymerization reaction, the reaction solution was added with 22.4 parts of a monomer mixture consisting of 8.8 parts of styrene monomer and 13.6 parts of isoprene monomer, and the reaction was further conducted for an hour. Subsequently, the reaction solution was added with 0.2 part of isopropyl alcohol to terminate the reaction. The weight average molecular weight (Mw) and molecular weight distribution (Mw/Mn) of the obtained block copolymer were determined as Mw=100,500 and Mw/Mn=1.07.

Then, the hydrogenation reaction was conducted similarly to that in Production Example 7. The obtained block copolymer is a binary block copolymer which consists of St/IP and St/Ip, with the individual block molar ratios of St/Ip:St/Ip= 28/42:9/21. In the block copolymer, Mw is 83,500, Mw/Mn is 1.16, the hydrogenation rate is 99.9%, and Tg is 123.5° C.

Production Example 10

The same stainless steel reaction vessel as that used in Production Example 7 was charged with 320 parts of dehydrated cyclohexane, 56 parts of styrene monomer, and 0.38 part of dibutyl ether. While stirring the resulting mixture at 60° C., 0.36 part of n-butyllithium solution (15% hexane solution) was added to start the polymerization reaction. After one hour of polymerization reaction, the reaction solution was added with 24 parts of a monomer mixture consisting of 23.92 parts of styrene monomer and 0.08 part of isoprene monomer, and the polymerization reaction was further conducted for an hour. Subsequently, the reaction solution was added with 0.2 part of isopropyl alcohol to terminate the reaction. The weight average molecular weight (Mw) and molecular weight distribution (Mw/Mn) of the obtained block copolymer were determined as Mw=102,000 and Mw/Mn=1.11.

Then, the hydrogenation reaction was conducted similarly to that in Production Example 7. The obtained block copolymer is a binary block copolymer which consists of St and St/Ip, with the individual block molar ratios of St:St/Ip= 70:30(St:Ip=29.85:0.15). In the block copolymer, Mw is 85,300, Mw/Mn is 1.17, the hydrogenation rate is 99.9%, and Tg is 132.1° C.

Production Example 11

The same stainless steel reaction vessel as that used in Production Example 7 was charged with 320 parts of dehydrated cyclohexane, 72 parts of styrene monomer, and 0.38 part of dibutyl ether. While stirring the resulting mixture at 60° C., 0.36 part of n-butyllithium solution (15% hexane solution) was added to start the polymerization reaction. After one hour of polymerization, the reaction solution was added with 8 parts of isoprene monomer, and the polymerization reaction was further conducted for an hour. Subsequently, the reaction solution was added with 0.2 part of isopropyl alcohol to terminate the reaction. The weight average molecular weight (Mw) and molecular weight distribution (Mw/Mn) of the obtained block copolymer were determined as Mw=101,300 and Mw/Mn=1.12.

Then, the hydrogenation reaction was conducted similarly to that in Production Example 7. The obtained block copolymer is a binary block copolymer which consists of St and Ip, with the individual block molar ratios of St:Ip=85:15. In the block copolymer, Mw is 83,300, Mw/Mn is 1.18, the hydrogenation rate is 99.9%, and Tg is 138.1° C.

Production Example 12

The same stainless steel reaction vessel as that used in Production Example 7 was charged with 320 parts of dehydrated cyclohexane, 80 parts of styrene monomer, and 0.38 part of dibutyl ether. While stirring the resulting mixture at 60° C., 0.36 part of n-butyllithium solution (15% hexane solution) was added to start the polymerization reaction. After two hours of polymerization, the reaction solution was added with 0.2 part of isopropyl alcohol to terminate the reaction. The weight average molecular weight (Mw) and molecular weight distribution (Mw/Mn) of the obtained block copolymer were determined as Mw=129,000 and Mw/Mn=1.04.

Then, the hydrogenation reaction was conducted similarly to that in Production Example 7. In the obtained hydrogenated polystyrene resin, Mw is 84,700, Mw/Mn is 1.10, the hydrogenation rate is 99.9%, and Tg is 145° C.

Example 1

A mixture was prepared by adding, to 100 parts of the block copolymer obtained in Production Example 1, 0.2 part of a soft polymer (manufactured by Kuraray Co., Ltd.; Septon 2002) and 0.1 part of an antioxidant (manufactured by Ciba-Geiygy Corp.; Irganox 1010); the mixture was kneaded with a biaxial kneading machine (manufactured by Toshiba Machine Co., Ltd.; TEM-35B, screw diameter: 37 mm, L/D=32, screw revolution speed: 150 rpm, resin temperature: 240° C., feed rate: 10 kg/h), and extruded as strands. The extruded strands were water cooled and cut into pellets with a pelletizer.

The obtained pellets were dried at 70° C. for 2 hours to be dehydrated by using a ventilated hot air dryer, and then were molded into an optical disk substrate of 85 mm in diameter by using an injection molding machine (manufactured by Sumitomo Heavy Industries, Ltd.; DISC-3) with the resin temperature set at 270° C. and the die temperature set at 100° C. The molded optical disk substrate was subjected to the measurements of the birefringence value and light transmittance. The die used was the one equipped with an optical disk stamper.

Furthermore, the aforementioned test specimen was molded using the above pellets, and the bending strength thereof was measured. The result is shown in Table 1.

Example 2

An optical disk substrate and a test specimen were molded in the same manner as that in Example 1 except that the block copolymer obtained in Production Example 2 was used. Similarly to Example 1, the birefringence value, light transmittance, and bending strength were measured and evaluated. The results are shown in Table 1.

Example 3

An optical disk substrate and a test specimen were molded in the same manner as that in Example 1 except that the block copolymer obtained in Production Example 3 was used. Similarly to Example 1, the birefringence value, light transmittance, and bending strength were measured and evaluated. The results are shown in Table 1.

Comparative Example 1

An optical disk substrate and a test specimen were molded in the same manner as that in Example 1 except that the block copolymer obtained in Production Example 4 was used. Similarly to Example 1, the birefringence value, light transmittance, and bending strength were measured and evaluated. The results are shown in Table 1.

Comparative Example 2

An optical disk substrate and a test specimen were molded in the same manner as that in Example 1 except that the block copolymer obtained in Production Example 5 was used. Similarly to Example 1, the birefringence value, light transmittance, and bending strength were measured and evaluated. The results are shown in Table 1.

Comparative Example 3

An optical disk substrate and a test specimen were molded in the same manner as that in Example 1 except that the block copolymer obtained in Production Example 6 was used. Similarly to Example 1, the birefringence value, light transmittance, and bending strength were measured and evaluated. The results are shown in Table 1.

Example 4

A mixture was prepared by adding, to 100 parts of the block copolymer obtained in the Production Example 7, 0.1 part of a soft polymer (manufactured by Kuraray Co., Ltd.; Septon 2002), 0.1 part of an antioxidant (manufactured by Ciba Specialty Chemicals, Inc.; Irganox 1010), 0.1 part of a benzotriazole based ultraviolet absorbent (Ciba Specialty Chemicals, Inc.; TINUVIN P), and further as a HALS, 0.1 part of a polycondensation product (HALS(A): Mn=3000) of dibutylamine, 1,3,5-triazine.N,N'-bis(2,2,6,6-tetramethyl-4-piperidyl)-1,6-hexamethylenediamine, and N-(2,2,6,6-tetramethyl-4-piperidyl)butylamine; the mixture was kneaded with a biaxial kneading machine (manufactured by Toshiba Machine Co., Ltd.; TEM-35B, screw diameter: 37 mm, L/D=32, screw revolution speed: 150 rpm, resin temperature: 240° C., feed rate: 10 kg/h), and extruded as strands. The extruded strands were water cooled and cut into pellets with a pelletizer.

The obtained pellets were dried and dehydrated at 70° C. for 2 hours using a ventilated hot air dryer, and then were injection molded into a 10.4 inch optical waveguide using an injection molding machine with a hot runner and an side gate die (manufactured by Toshiba Machine Co., Ltd.; product No. IS450). The molding conditions were that the die temperature was set at 80° C. and the cylinder temperature at 280° C.

The obtained optical waveguide has the following dimension and shape: the light incidence side thickness of the thick portion is 2.5 mm, the thickness of the thin portion opposite thereto is 1.5 mm, the length from the thick portion side to the thin portion side is 190 mm, the length along the axis of a linear light source is 250 mm, and the shape is such a wedge shape that the thickness tapers from the thick portion to the thin portion (approximately along the direction perpendicular to the axis of the linear light source). The heat resistance and transparency of the optical waveguide were measured on the basis of the above described methods. The results are listed in Table 2.

Furthermore, the aforementioned test specimen was molded using the above pellets, and the bending strength thereof was measured. The result is shown in Table 2.

Examples 5 to 8

Optical waveguides and test specimens were molded in the same manner as that in Example 4 except that the block

TABLE 1

| | Polymer | | | | Physical properties | | |
|---|---|---|---|---|---|---|---|
| | Composition (mol) | Mw | Mw/Mn | Tg (° C.) | Birefringence | Light transmittance (%) | Bending strength |
| Ex. 1 | St-(St/Ip)-St 33-19/15-33 | 91,200 | 1.12 | 125.5 | ⊚ | 89 | ⊚ |
| Ex. 2 | St-(St/Ip) 66-19/15 | 92,300 | 1.11 | 127.1 | ⊚ | 89 | ⊚ |
| Ex. 3 | St-(St/Ip) 4-76.8/19.2 | 92,300 | 1.12 | 126.5 | ○ | 85 | ○ |
| Comp. Ex. 1 | St-Ip-St 40-20-40 | 90,900 | 1.10 | 139 | ○ | 79 | X |
| Comp. Ex. 2 | (St/Ip)-(St/Ip) 28/42-9/21 | 92,700 | 1.15 | 117.5 | X | 80 | X |
| Comp. Ex. 3 | St-(St/Ip) 80-19.9/0.1 | 92,500 | 1.12 | 140.5 | ⊚ | 88 | X | copolymers obtained in Production Examples 8 to 11 were respectively used. Similarly to Example 4, the heat resistances, transparencies, and bending strengths were measured and evaluated. The results are shown in Table 2.

Comparative Example 4

An optical waveguide and a test specimen were molded in the same manner as that in Example 4 except that the hydrogenated polystyrene resin obtained in Production Example 12 was used. Similarly to Example 4, the heat resistance, transparency, and bending strength were measured and evaluated. The results are shown in Table 2.

TABLE 2

| | Heat resistance | Transparency (transmittance for 250 mm) (%) | Bending strength |
|---|---|---|---|
| Ex. 4 | No deformation | 80 | ◎ |
| Ex. 5 | No deformation | 80 | ◎ |
| Ex. 6 | Slight deformation in both ends of light incidence face (no effect on luminance etc.) | 76 | ○ |
| Ex. 7 | No deformation | 78 | ○ |
| Ex. 8 | No deformation | 78 | ○ |
| Comp. Ex. 4 | No deformation | 80 | X |

Example 9

A mixture was prepared by adding, to 100 parts of the block copolymer obtained in the Production Example 7, 0.1 part of a soft polymer (manufactured by Kuraray Co., Ltd.; Septon 2002), 0.1 part of an antioxidant (manufactured by Ciba Specialty Chemicals, Inc.; Irganox 1010), 0.1 part of 2-(2'hydroxy-5'-methyl-phenyl)benzotriazole (Ciba Specialty Chemicals, Inc.; TINUVIN P) as a benzotriazole based ultraviolet absorbent, and further as a HALS, 0.1 part of a polycondensation product (HALS(A): Mn=3000) of dibutylamine, 1,3,5-triazine.N,N'-bis(2,2,6,6-tetramethyl-4-piperidyl)-1,6,-hexamethylenediamine, and N-(2,2,6,6-tetramethyl-4-piperidyl)butylamine; the mixture was kneaded with a biaxial kneading machine (manufactured by Toshiba Machine Co., Ltd.; TEM-35B, screw diameter: 37 mm, L/D=32, screw revolution speed: 150 rpm, resin temperature: 240° C., feed rate: 10 kg/h), and extruded as strands. The extruded strands were water cooled and cut into pellets with a pelletizer.

The obtained pellets were dried at 70° C. for 2 hours to be dehydrated by using a ventilated hot air dryer, and then were extrusion molded into a film of 300 μm in thickness and 500 mm×1,000 mm, by using a T-die film melt extrusion molding machine having a resin melt kneading machine equipped with a screw of 65 mm φ, under the molding conditions of the melted resin temperature set at 220° C. and the T-die width set at 500 mm. The heat resistance, transparency, and mechanical strength of the obtained film were evaluated. The results are listed in Table 3.

Examples 10 to 13

Films and sheets were molded in the same manner as that in Example 9 except that the block copolymers obtained in Production Examples 8 to 11 were respectively used. Similarly to Example 9, the heat resistances, transparencies, and mechanical strengths were measured and evaluated. The results are shown in Table 3.

Comparative Example 5

A film and a sheet were molded in the same manner as that in Example 9 except that the hydrogenated polystyrene resin obtained in Production Example 12 was used. Similarly to Example 9, the heat resistance, transparency, and mechanical strength were measured and evaluated. The results are shown in Table 3.

Comparative Example 6

A base film of 300 μm in thickness and 500 mm×1,000 mm was extrusion molded by using a styrene-butadiene-styrene block copolymer (Kraton KX408P: manufactured by Shell Chemical Co.) with a T-die film melt extrusion molding machine having a resin melt kneading machine equipped with a screw of 65 mm φ, under the molding conditions of the melted resin temperature set at 220° C. and the T-die width set at 500 mm. The heat resistance, transparency, and mechanical strength of the obtained film were evaluated. The results are listed in Table 3.

TABLE 3

| | Heat resistance | Transparency | Tear strength | Tensile elastic modulus |
|---|---|---|---|---|
| Ex. 9 | ◎ | ◎ | ◎ | ◎ |
| Ex. 10 | ◎ | ◎ | ◎ | ◎ |
| Ex. 11 | ○ | ○ | ◎ | ◎ |
| Ex. 12 | ◎ | ◎ | ○ | ○ |
| Ex. 13 | ○ | ○ | ○ | ○ |
| Comp. Ex. 5 | ◎ | ◎ | X | ○ |
| Comp. Ex. 6 | X | X | X | X |

Example 14

A mixture was prepared by adding, to 100 parts of the block copolymer obtained in the Production Example 7, 0.1 part of a styrene-ethylene-butylene-styrene block copolymer (manufactured by Kuraray Co., Ltd.; Septon 2002), 0.1 part of tetrakis-[methylene-3-(3',5'-di-tert-butyl-4'-hydroxyphenyl)propionate]methane (manufactured by Ciba Specialty Chemicals, Inc.; Irganox 1010) as an antioxidant, 0.1 part of 2-(2'-hydroxy-5'-methyl-phenyl)benzotriazole (Ciba Specialty Chemicals, Inc.; TINUVIN P) as a benzotriazole based ultraviolet absorbent, and further as a HALS, 0.1 part of a polycondensation product (HALS(A): Mn=3000) of dibutylamine, 1,3,5-triazine.N,N'-bis(2,2,6,6-tetramethyl-4-piperidyl)-1,6,-hexamethylenediamine, and N-(2,2,6,6-tetramethyl-4-piperidyl)butylamine; the mixture was kneaded with a biaxial kneading machine (manufactured by Toshiba Machine Co., Ltd.; TEM-35B, screw diameter: 37 mm, L/D=32, screw revolution speed: 150 rpm, resin temperature: 240° C., feed rate: 10 kg/h), and extruded as strands. The extruded strands were water cooled and cut into pellets with a pelletizer.

The obtained pellets were dried at 70° C. for 2 hours to be dehydrated by using a ventilated hot air dryer, and then were molded into a box-shaped (open-topped) container in which the resin layer thickness is 1 mm, the bottom face is a 200 mm×300 mm rectangle, and the four edges thereof each has a 150 mm high side wall, by using an injection molding machine, under the molding conditions of the cylinder temperature set at 250° C., the die temperature set at 80° C., the primary injection pressure of 98.1 MPa, and the secondary injection pressure of 78.4 MPa. The container did not exhibit any surface sink, warping, and fins, the surface being flat and smooth.

The heat resistance, transparency, and mechanical strength of the obtained container were evaluated. The results are listed in Table 4.

Examples 15 to 18

Containers were molded in the same manner as that in Example 14 except that the pellets of the block copolymers obtained in Production Examples 8 to 11 were respectively used in place of the pellets of the block copolymer obtained in Production Example 7. Similarly to Example 14, the heat resistances, transparencies, and mechanical strengths were measured and evaluated. The results are shown in Table 4.

Comparative Example 7

A container was molded in the same manner as that in Example 14 except that the pellets of the hydrogenated polystyrene resin obtained in Production Example 12 was used in place of the pellets of the block copolymer obtained in Production Example 7. Similarly to Example 14, the heat resistance, transparency, and mechanical strength were measured and evaluated. The results are shown in Table 4.

Comparative Example 8

A container was molded in the same manner as that in Example 14 except that a styrene-ethylene-butylene-styrene block copolymer (manufactured by Shell Chemical Co.; Kraton KX408, a hydrogenated styrene butadiene block copolymer) was used in place of the pellets of the block copolymer obtained in Production Example 7. As in Example 14, the heat resistance, transparency, and mechanical strength of the obtained container were evaluated. The results are shown in Table 4.

TABLE 4

| | Injection moldability | Heat resistance | Transparency | Bending strength | Bending elastic modulus |
|---|---|---|---|---|---|
| Ex. 14 | ⊙ | ⊙ | ⊙ | ⊙ | ⊙ |
| Ex. 15 | ⊙ | ⊙ | ⊙ | ⊙ | ⊙ |
| Ex. 16 | ○ | ○ | ○ | ⊙ | ⊙ |
| Ex. 17 | ⊙ | ⊙ | ⊙ | ○ | ○ |
| Ex. 18 | ⊙ | ○ | ○ | ⊙ | ⊙ |
| Comp. Ex. 7 | ○ | ⊙ | ⊙ | X | ○ |
| Comp. Ex. 8 | X | X | X | X | X |

As shown in Table 4, the containers molded by using the block copolymers related to the present invention are free of defective molding, excellent in heat resistance and transparency, and additionally large in such mechanical strengths as bending strength and bending elastic modulus (Examples 14 to 18).

On the contrary, the container molded by using the hydrogenated polystyrene is satisfactory in heat resistance and transparency, but the mechanical strength is small (Comparative Example 7). Additionally, when a styrene-ethylene-butylene-styrene block copolymer was used, the accurate shape was not able to be formed in the injection molding; the molded product is poor in heat resistance and transparency, and is low in bending strength and bending elastic modulus (Comparative Example 8).

Example 19

A mixture was prepared by adding, to 100 parts of the block copolymer obtained in the Production Example 7, 0.1 part of a styrene-ethylene-butylene-styrene block copolymer (manufactured by Kuraray Co., Ltd.; Septon 2002), 0.1 part of tetrakis-[methylene-3-(3',5'-di-tert-butyl-4'-hydroxyphenyl)propionate]methane (manufactured by Ciba Specialty Chemicals, Inc.; Irganox 1010) as an antioxidant, 0.1 part of 2-(2'-hydroxy-5'-methyl-phenyl)benzotriazole (Ciba Specialty Chemicals, Inc.; TINUVIN P) as a benzotriazole based ultraviolet absorbent, and further as a HALS, 0.1 part of a polycondensation product (HALS(A): Mn=3000) of dibutylamine, 1,3,5-triazine.N,N'-bis(2,2,6,6-tetramethyl-4-piperidyl)-1,6,-hexamethylenediamine, and N-(2,2,6,6-tetramethyl-4-piperidyl)butylamine; the mixture was kneaded with a biaxial kneading machine (manufactured by Toshiba Machine Co., Ltd.; TEM-35B, screw diameter: 37 mm, L/D=32, screw revolution speed: 150 rpm, resin temperature: 240° C., feed rate: 10 kg/h), and extruded as strands. The extruded strands were water cooled and cut into pellets with a pelletizer.

The obtained pellets were dried at 70° C. for 2 hours to be dehydrated by using a ventilated hot air dryer, and then were molded into a pickup lens, shown in FIG. 2, for a signal reading device for a magneto-optical disk, by using an injection molding machine (manufactured by FANUC Ltd.; AUTOSHOTC MODEL 30A), under the conditions of the cylinder temperature of 80° C., the die temperature of 280° C., the primary injection pressure of 98.1 MPa, and the secondary injection pressure of 78.4 MPa. The dimension of the obtained lens is as follows: the central portion thickness $a=1.7$ mm ($a_1=1.572$ mm, $a_2=0.128$ mm); the diameters of the effective portion: $b_1=3.9$ mm, $b_2=3.5$ mm; the peripheral thickness of the effective portion: $c=0.41$ mm. The test results for the polymer and lens are shown in Table 5.

Examples 20 to 22

Pickup lenses were molded in the same manner as that in Example 19 except that the pellets of the block copolymers obtained in Production Examples 8 to 10 were respectively used in place of the pellets of the block copolymer obtained in Production Example 7. The test results for the polymers and lenses are listed in Table 5.

Comparative Example 9

A pickup lens was molded in the same manner as that in Example 19 except that the pellets of the block copolymer obtained in Production Example 11 were used in place of the pellets of the block copolymer obtained in Production Example 7. The test results for the polymer and lens are listed in Table 5.

Comparative Example 10

A pickup lens was molded in the same manner as that in Example 19 except that the pellets of the hydrogenated polystyrene resin obtained in Production Example 12 were used in place of the pellets of the block copolymer obtained in Production Example 7. The test results for the polymer and lens are listed in Table 5.

Comparative Example 11

A pickup lens was molded in the same manner as that in Example 19 except that the pellets of a styrene-ethylene-butylene-styrene block copolymer (manufactured by Shell Chemical Co.; Kraton KX408, a hydrogenated product of a styrene-butadiene-styrene block copolymer) was used in place of the pellets of the block copolymer obtained in Production Example 7. It should be noted that some chipped portions were found in places on the periphery of the thin lens. The test results for the polymer and lens are listed in Table 5.

TABLE 5

|  | Moldability | Transparency | Birefringence | Heat resistance | Bending strength | Bending elastic modulus |
|---|---|---|---|---|---|---|
| Ex. 19 | Good | ⊚ | ⊚ | ⊚ | ⊚ | ⊚ |
| Ex. 20 | Good | ⊚ | ⊚ | ⊚ | ⊚ | ⊚ |
| Ex. 21 | Good | ⊚ | ○ | ○ | ⊚ | ⊚ |
| Ex. 22 | Good | ⊚ | ⊚ | ⊚ | ○ | ○ |
| Comp. Ex. 9 | Good | Δ | Δ | ○ | ○ | ○ |
| Comp. Ex. 10 | Crack | ⊚ | ⊚ | ⊚ | X | ○ |
| Comp. Ex. 11 | Non-moldable | X | X | X | X | X |

As shown in Table 5, the pickup lenses, as shown in FIG. 2, downsized and made uneven in thickness were able to be molded by using the block copolymers related to the present invention. Additionally, these optical lenses are excellent in transparency and low birefringence; the materials forming the lenses are satisfactory in heat resistance, and large in such mechanical strengths as the bending strength and bending elastic modulus (Examples 19 to 22).

On the contrary, the lens, which was molded using the block copolymer of Production Example 11 containing no repeating unit [1] in the soft segment block [B], is slightly low in transparency, exhibits some birefringence, and accordingly does not reach a level to be required for a pickup lens (Comparative Example 9). Additionally, the hydrogenated polystyrene is satisfactory in heat resistance and transparency, but the mechanical strength is small, so that cracks have been generated in the lens molded using thereof, and the lens is defective as a thin lens (Comparative Example 10). The hydrogenated product of styrene-butadiene-styrene block copolymer is low in birefringence, but poor in transparency and heat resistance, and the mechanical strength is insufficient, so that no thin lens could have been molded.

INDUSTRIAL APPLICABILITY

According to the present invention, there are provided novel block copolymers excellent in low birefringence, mechanical strength, and light transmittance, production methods of the block copolymers, compositions of the block copolymers, and molded objects produced by molding the block copolymers or the compositions thereof.

Additionally, according to the present invention, there are provided such optical information recording mediums as optical disks, optical waveguides, films, sheets, containers, optical lenses, and the like which are all molded by using such block copolymers having alicyclic structure as described above.

What is claimed is:

1. A block copolymer comprising a polymer block [A] and a polymer block [B], in which:

(i) the polymer block [A] contains a repeating unit[1] represented by the following formula (1) in a proportion of 50 mol % or more,

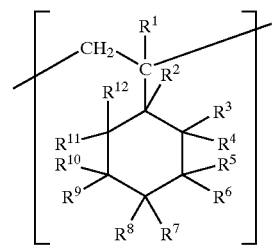

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom;

(ii) the polymer block [B] contains said repeating unit [1], and at least one repeating unit selected from the group consisting of a repeating unit [4] represented by the following formula (4),

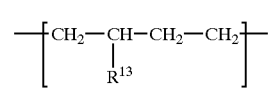

where $R^{13}$ represents a hydrogen atom or an alkyl group having 1 to 20 carbon atoms, and a repeating unit [5] represented by the following formula (5),

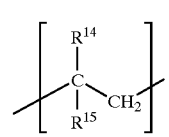

where $R^{14}$ and $R^{15}$ each represents independently a hydrogen atom or an alkyl group having 1 to 20 carbon atoms; and the molar fraction $m_2$ (mol %) of the repeating unit [4] and the molar fraction $m_3$ (mol %) of the repeating unit [5] in said polymer block [B] satisfy the relationship represented by the following expression:

$$2 \times m_2 + m_3 \geq 2 (\text{mol \%});$$

(iii) the molar fraction a (mol %) of the repeating unit [1] in the polymer block [A] and the molar fraction b (mol %) of the repeating unit [1] in the polymer block [B] satisfy the relationship represented by a>b; and
   (iv) the weight average molecular weight falls in the range from 10,000 to 300,000.

2. The block copolymer according to claim 1, in which:

(v) the ratio ($m_a$:$m_b$) between the total number of moles $m_a$ of all the repeating units constituting the polymer block [A] and the total number of moles $m_b$ of all the repeating units constituting the polymer block [B] falls in the range from 5:95 to 95:5.

3. The block copolymer according to claim 1, containing a block structure represented by:

$(A-B)_n$;

$(A-B)_n$-A; or $(B-A)_n$-B;

where A represents the polymer block [A], B represents the polymer block [B], and n is an integer of from 1 to 10.

4. The block copolymer according to claim 1, in which the ratio (Mw/Mn) between the weight average molecular weight (Mw) and number average molecular weight (Mn) of said block copolymer is 5 or less.

5. The block copolymer according to claim 1, in which the polymer block [A] is the block of a hydrogenated product of polystyrene, and the polymer block [B] is the block of a hydrogenated product of styrene-isoprene copolymer.

6. A block copolymer composition, comprising the block copolymer according to claim 1.

7. The block copolymer composition according to claim 6, containing a stabilizer.

8. The block copolymer composition according to claim 6, containing at least one compounding agent selected from the group consisting of (1) a soft polymer, (2) an alcoholic compound, and (3) an organic or inorganic filler.

9. A laminated object having the layers comprising the block copolymer according to claim 1.

10. A molded object comprising the block copolymer according to claim 1.

11. The molded object according to claim 10 which is an optical information recording medium substrate.

12. The molded object according to claim 11, in which the optical information recording medium substrate is an optical disk substrate.

13. The molded object according to claim 10 which is an optical waveguide.

14. The molded object according to claim 10 which is a film or a sheet.

15. The molded object according to claim 10 which is a container.

16. The molded object according to claim 10 which is an optical lens.

17. A production method of a block copolymer containing the polymer block (A) and the polymer block (B), wherein (i) the polymer block (A) contains a repeating unit [1] represented by the following formula (1) in a proportion of 50 mol % or more, $$\left[ \begin{array}{c} CH_2 \diagdown \ \diagup R^1 \\ \diagup C \diagdown R^2 \\ R^{12} \quad\quad R^3 \\ R^{11} \quad\quad R^4 \\ R^{10} \quad\quad R^5 \\ R^9 \quad\quad R^6 \\ R^8 \quad R^7 \end{array} \right] \quad (1)$$

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom;

(ii) the polymer block [B] contains said repeating unit [1], and at least one repeating unit selected from the group consisting of a repeating unit [4] represented by the following formula (4), $$\left[ CH_2-CH-CH_2-CH_2 \atop \quad\quad\ |\ R^{13} \right] \quad (4)$$

where $R^{13}$ represents a hydrogen atom or an alkyl group having 1 to 20 carbon atoms, and a repeating unit [5] represented by the following formula (5), $$\left[ \begin{array}{c} R^{14} \\ | \\ C \\ | \diagdown CH_2 \\ R^{15} \end{array} \right] \quad (5)$$

where $R^{14}$ and $R^{15}$ each represents independently a hydrogen atom or an alkyl group having 1 to 20 carbon atoms; and the molar fraction $m_2$ (mol %) of the repeating unit [4] and the molar fraction $m_3$ (mol %) of the repeating unit [5] in said polymer block [B] satisfy the relationship represented by the following expression:

$2 \times m_2 + m_3 \geq 2 (\text{mol }\%)$; in which:

a block copolymer containing a polymer block [A'] and a polymer block [B'] is synthesized by a process which comprises at least each one of the following processes (I) and (II) in an arbitrary order:

(I) a process for obtaining a polymer block [A'] by polymerizing a monomer mixture [a'] containing an aromatic vinyl compound in a proportion of 50 mol % or more, and (II) a process for obtaining a polymer block [B'] by polymerizing a monomer mixture [b'] containing a vinyl based monomer in 2 mol % or more, and the aromatic vinyl compound in a proportion smaller than that in the monomer mixture [a']; and which then comprises:

(III) a process for hydrogenating the carbon-carbon unsaturated bonds in said block copolymer.

18. The production method according to claim 17, in which: the polymer block [A'] contains a repeating unit [7] represented by the following formula (7), $$\left[ \begin{array}{c} CH_2 \diagdown \ \diagup R^{19} \\ \diagup C \\ R^{24} \quad\quad R^{20} \\ \\ R^{23} \quad\quad R^{21} \\ R^{22} \end{array} \right] \quad (7)$$

where $R^{19}$ represents a hydrogen atom or an alkyl group having 1 to 20 carbon atoms, $R^{20}$ to $R^{24}$ each represents independently a hydrogen atom, an alkyl group having 1 to 20 carbon atoms, a hydroxyl group, an alkoxy group having 1 to 20 carbon atoms, or a halogen atom; and the polymer block [B'] contains said repeating unit [7], and at least one repeating unit selected from the group consisting of a repeating unit (9) represented by the following formula (9)

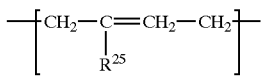

(9)

where $R^{25}$ represents a hydrogen atom or an alkyl group having 1 to 20 carbon atoms, and the repeating unit (10) represented by the following formula (10),

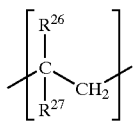

(10)

where $R^{26}$ represents a hydrogen atom or an alkyl group having 1 to 20 carbon atoms, and $R^{27}$ represents a hydrogen atom, an alkyl group having 1 to 20 carbon atoms, or an alkenyl group having 2 to 20 carbon atoms.

19. An optical waveguide produced by molding the block copolymer comprising:

the polymer block [A] containing the repeating unit [1] represented by the following formula (1) in a proportion of 50 mol % or more,

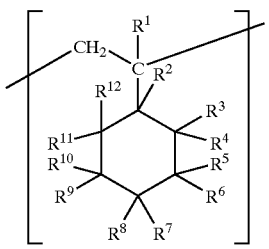

(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom; and the block [B] containing at least one repeating unit selected from the group consisting of the repeating unit [4] represented by the following formula (4),

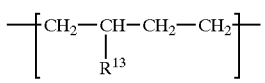

(4)

where $R^{13}$ represents a hydrogen atom or an alkyl group having 1 to 20 carbon atoms, and the repeating unit [5] represented by the following formula (5),

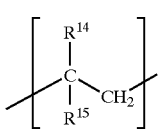

(5)

where $R^{14}$ and $R^{15}$ each represents independently a hydrogen atom or an alkyl group having 1 to 20 carbon atoms.

20. The optical waveguide according to claim 19, in which the polymer block [B] further contains the repeating unit [1], and the molar fraction a (mol %) of the repeating unit [1] in the polymer block [A] and the molar fraction b (mol %) of the repeating unit [1] in the polymer block [B] satisfy the relationship represented by a>b.

21. The optical waveguide according to claim 19, in which in the polymer block [B], the molar fraction $m_2$ (mol %) of the repeating unit [4] therein and the molar fraction $m_3$ (mol %) of the repeating unit [5] therein satisfy the relationship represented by the following expression:

$$2 \times m_2 + m_3 \geq 2 (\text{mol } \%).$$

22. The optical waveguide according to claim 19, in which in the block copolymer, the ratio ($m_a:m_b$) between the total number of moles $m_a$ of all the repeating units constituting the polymer block [A] and the total number $m_b$ of moles of all the repeating units constituting the polymer block [B] falls in the range from 5:95 to 95:5.

23. The optical waveguide according to claim 19, in which the block copolymer contains 0.001 to 5 parts by weight of an antiaging agent in relation to 100 parts by weight of the block copolymer.

24. The optical waveguide according to claim 19, in which the block copolymer contains 0.01 to 20 parts by weight of a hindered amine based light stabilizer in relation to 100 parts by weight of the block copolymer.

25. A film or sheet produced by molding the block copolymer comprising:

the polymer block [A] containing the repeating unit [1] represented by the following formula (1) in a proportion of 50 mol % or more,

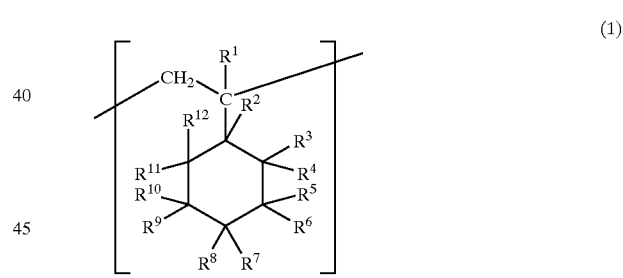

(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom; and the block [B] containing at least one repeating unit selected from the group consisting of the repeating unit [4] represented by the following formula (4),

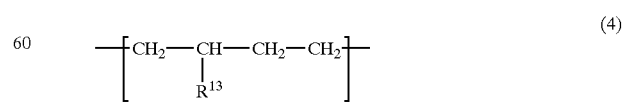

(4)

where $R^{13}$ represents a hydrogen atom or an alkyl group having 1 to 20 carbon atoms, and the repeating unit [5] represented by the following formula (5),

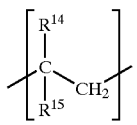
(5)

where $R^{14}$ and $R^{15}$ each represents independently a hydrogen atom or an alkyl group having 1 to 20 carbon atoms.

26. The film or sheet according to claim 25, in which the polymer block [B] further contains the repeating unit [1], and the molar fraction a (mol %) of the repeating unit [1] in the polymer block [A] and the molar fraction b (mol %) of the repeating unit [1] in the polymer block [B] satisfy the relationship represented by a>b.

27. The film or sheet according to claim 25, in which in the polymer block [B], the molar fraction $m_2$ (mol %) of the repeating unit [4] therein and the molar fraction $m_3$ (mol %) of the repeating unit [5] therein satisfy the relationship represented by the following expression:

$$2 \times m_2 + m_3 \geq 2 (\text{mol \%}).$$

28. The film or sheet according to claim 25, in which in the block copolymer, the ratio ($m_a$:$m_b$) between the total number of moles $m_a$ of all the repeating units constituting the polymer block [A] and the total number $m_b$ of moles of all the repeating units constituting the polymer block [B] falls in the range from 5:95 to 95:5.

29. The film or sheet according to claim 25, for the optical use or for use as wrapping material.

30. A container produced by molding the block copolymer comprising:

the polymer block [A] containing the repeating unit [1] represented by the following formula (1) in a proportion of 50 mol % or more,

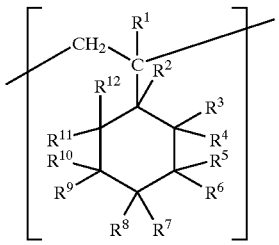
(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom; and the block [B] containing at least one repeating unit selected from the group consisting of the repeating unit [4] represented by the following formula (4),

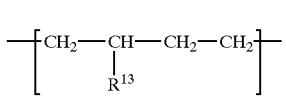
(4)

where $R^{13}$ represents a hydrogen atom or an alkyl group having 1 to 20 carbon atoms, and the repeating unit [5] represented by the following formula (5),

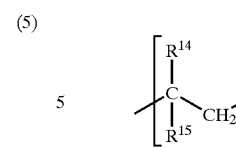
(5)

where $R^{14}$ and $R^{15}$ each represents independently a hydrogen atom or an alkyl group having 1 to 20 carbon atoms.

31. The container according to claim 30, in which the polymer block [B] further contains the repeating unit [1], and the molar fraction a (mol %) of the repeating unit [1] in the polymer block [A] and the molar fraction b (mol %) of the repeating unit [1] in the polymer block [B] satisfy the relationship represented by a>b.

32. The container according to claim 30, in which in the polymer block [B], the molar fraction $m_2$ (mol %) of the repeating unit [4] therein and the molar fraction $m_3$ (mol %) of the repeating unit [5] therein satisfy the relationship represented by the following expression:

$$2 \times m_2 + m_3 \geq 2 (\text{mol \%}).$$

33. The container according to claim 30, in which in the block copolymer, the ratio ($m_a$:$m_b$) between the total number of moles $m_a$ of all the repeating units constituting the block [A] and the total number $m_b$ of moles of all the repeating units constituting the block [B] falls in the range from 5:95 to 95:5.

34. An optical lens produced by molding the block copolymer comprising:

the polymer block [A] containing the repeating unit [1] represented by the following formula (1) in a proportion of 50 mol % or more,

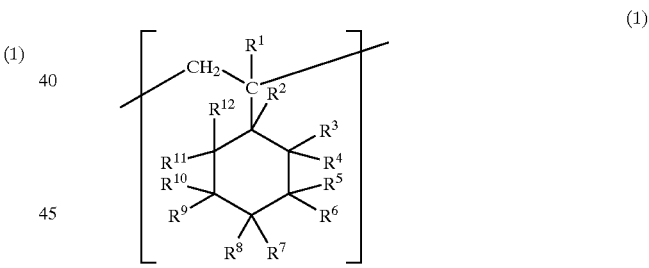
(1)

where $R^1$ represents a hydrogen atom or an alkyl group having 1 to 20 carbon atoms, $R^2$ to $R^{12}$ each represents independently a hydrogen atom, an alkyl group having 1 to 20 carbon atoms, a hydroxyl group, an alkoxy group having 1 to 20 carbon atoms, or a halogen atom; and the block [B] containing the repeating unit [1] and at least one repeating unit selected from the group consisting of the repeating unit [4] represented by the following formula (4),

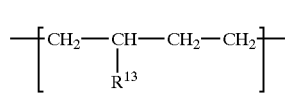
(4)

where $R^{13}$ represents a hydrogen atom or an alkyl group having 1 to 20 carbon atoms, and the repeating unit [5] represented by the following formula (5),

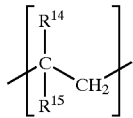

(5)

where $R^{14}$ and $R^{15}$ each represents independently a hydrogen atom or an alkyl group having 1 to 20 carbon atoms; and
   in which block copolymer, the molar fraction a (mol %) of the repeating unit [1] in the polymer block [A] and the molar fraction b (mol %) of the repeating unit [1] in the polymer block [B] satisfy the relationship represented by a>b.

35. The optical lens according to claim 34, in which in the polymer block [B] of the block copolymer, the molar fraction $m_2$ (mol %) of the repeating unit [4] therein and the molar fraction $m_3$ (mol %) of the repeating unit [5] therein satisfy the relationship represented by the following expression:

$$2 \times m_2 + m_3 \geq 2 (\text{mol \%}).$$

36. The optical lens according to claim 34, in which in the block copolymer, the ratio ($m_a:m_b$) between the total number of moles $m_a$ of all the repeating units constituting the polymer block [A] and the total number $m_b$ of moles of all the repeating units constituting the polymer block [B] falls in the range from 5:95 to 95:5.

* * * * *